US012322881B2

(12) United States Patent
Mathews et al.

(10) Patent No.: US 12,322,881 B2
(45) **Date of Patent: *Jun. 3, 2025**

(54) ANTENNA ELEMENT MODULE

(71) Applicant: VIASAT, INC., Carlsbad, CA (US)

(72) Inventors: Douglas J. Mathews, Mesa, AZ (US); David C. Wittwer, Chandler, AZ (US); James F. Landers, Mesa, AZ (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,439

(22) Filed: Feb. 14, 2024

(65) Prior Publication Data

US 2024/0347917 A1 Oct. 17, 2024

Related U.S. Application Data

(63) Continuation of application No. 17/261,086, filed as application No. PCT/US2019/044525 on Jul. 31, 2019, now Pat. No. 11,936,124.

(60) Provisional application No. 62/713,871, filed on Aug. 2, 2018.

(51) Int. Cl.

| | |
|---|---|
| ***H01Q 1/22*** | (2006.01) |
| ***H01Q 9/04*** | (2006.01) |
| ***H01Q 21/00*** | (2006.01) |
| ***H01Q 21/06*** | (2006.01) |

(52) U.S. Cl.

CPC ......... *H01Q 9/0457* (2013.01); *H01Q 1/2283* (2013.01); *H01Q 21/0025* (2013.01); *H01Q 21/065* (2013.01)

(58) Field of Classification Search

CPC ............... H01Q 1/2283; H01Q 9/0457; H01Q 21/0025; H01Q 21/065

See application file for complete search history.

(56) References Cited

U.S. PATENT DOCUMENTS

| | | | |
|---|---|---|---|
| 2014/0085146 A1 | 3/2014 | Azuma et al. |
| 2018/0115072 A1 | 4/2018 | Pance et al. |

FOREIGN PATENT DOCUMENTS

| | | |
|---|---|---|
| CN | 107919522 | 4/2018 |
| CN | 116885457 A * | 10/2023 |
| JP | H-0897625 | 4/1996 |

OTHER PUBLICATIONS

U.S. Appl. No. 17/261,086, Antenna Element Module, filed Jan. 18, 2021, Douglas J. Mathews.

* cited by examiner

*Primary Examiner* — Daniel Munoz

(74) *Attorney, Agent, or Firm* — Snell & Wilmer L.L.P.

(57) ABSTRACT

An antenna element can include a feed and a radiating element and a dielectric substrate having a first surface and a second surface, the dielectric substrate comprising the feed of the antenna element within the dielectric substrate. The antenna element module can also include an integrated circuit (IC) chip adhered to the first surface the dielectric substrate and coupled to the feed of the antenna element. The IC chip can include a circuit to adjust a signal communicated with the feed. The antenna element module can further include a plastic antenna carrier adhered to the second surface of the dielectric substrate. The plastic antenna carrier can include a body portion comprising a cavity for the radiating element of the antenna element, the radiating element positioned in the cavity of the body portion of the plastic antenna carrier.

22 Claims, 22 Drawing Sheets

ANTENNA ELEMENT MODULE

RELATED APPLICATIONS

The present application is a continuation application of U.S. application Ser. No. 17/261,086 filed Jan. 18, 2021, entitled "Antenna Element Module". U.S. application Ser. No. 17/261,086 is a National Stage Application under 35 USC 371 claiming priority to PCT/US2019/044525 filed Jul. 31, 2019, entitled "Antenna Element Module". PCT/US2019/044525 claims the benefit of priority to U.S. Provisional Application No. 62/713,871 filed on Aug. 2, 2018, entitled, "Phased Array Antenna", the entirety of which are incorporated herein by reference.

TECHNICAL FIELD

This relates generally to an antenna element module.

BACKGROUND

An antenna array (or array antenna) is a set of multiple connected antenna elements that work together as a single antenna to transmit or receive radio waves. The individual antenna elements (often referred to simply as "elements") can be connected to a receiver or transmitter by feedlines that feed the power to the elements in a specific phase relationship. The radio waves radiated by each individual antenna element combine and superpose with each other, adding together (interfering constructively) to enhance the power radiated in desired directions, and cancelling (interfering destructively) to reduce the power radiated in other directions. Similarly, when used for receiving, the separate radio frequency currents from the individual antenna elements combine in the receiver with the correct phase relationship to enhance signals received from the desired directions and cancel signals from undesired directions.

An antenna array can achieve an elevated gain (directivity) with a narrower beam of radio waves than could be achieved by a single antenna. In general, the larger the number of individual antenna elements used, the higher the gain and the narrower the beam. Some antenna arrays (such as phased array radars) can be composed of thousands of individual antennas. Arrays can be used to achieve higher gain (which increases communication reliability), to cancel interference from specific directions, to steer the radio beam electronically to point in different directions and for radio direction finding (RDF).

SUMMARY

One example relates to an antenna element module that can include an antenna element including a feed and a radiating element and a dielectric substrate having a first surface and a second surface, the dielectric substrate comprising the feed of the antenna element within the dielectric substrate. The antenna element module can also include an integrated circuit (IC) chip adhered to the first surface the dielectric substrate and coupled to the feed of the antenna element. The IC chip can include a circuit to adjust a signal communicated with the feed. The antenna element module can further include a plastic antenna carrier adhered to the second surface of the dielectric substrate. The plastic antenna carrier can include a body portion comprising a cavity for the radiating element of the antenna element, the radiating element positioned in the cavity of the body portion of the plastic antenna carrier.

Another example relates to phased array antenna. The phased array antenna can include an array of antenna element modules. Each of the array of antenna element modules can include an antenna element including a feed and a radiating element and a dielectric substrate having a first surface and a second surface, the dielectric substrate comprising the feed of the antenna element within the dielectric substrate. Each of the array of antenna element modules can also include an IC chip adhered to the first surface of the dielectric substrate and coupled to the feed of the antenna element, the IC chip including a circuit to adjust a signal communicated with the feed and a plastic antenna carrier adhered to the first surface of the dielectric substrate. The plastic antenna carrier can include a body portion comprising a cavity for the radiating element of the antenna element, the radiating element positioned in the cavity of the body portion of the plastic antenna carrier. The phased array antenna can further include a multi-layer substrate underlying the array of antenna element modules, the multi-layer substrate including a beam forming network (BFN) circuit formed on a layer of the multi-layer substrate and the BEN circuit is in electrical communication with the IC chip of each of the array of antenna element modules.

Another example relates to a method for forming a plurality of antenna element modules. The method can include adhering a plurality of IC chips to a first surface of a dielectric substrate, wherein the dielectric substrate comprises a plurality of feeds within the dielectric substrate. The method can also include adhering an array of antenna packages to a second surface of the dielectric substrate to form an array of antenna element modules. Each antenna package can include a plastic antenna carrier, the plastic antenna carrier that can include a body portion comprising a cavity for a radiating element. Each antenna package can also include a radiating element of a radiating antenna positioned in the cavity of the body portion of the plastic antenna carrier. The method can further include singulating the array of antenna element modules to form the plurality of antenna element modules.

DETAILED DESCRIPTION

This disclosure describes a phased array antenna wherein a plurality of antenna element modules can be mounted on a multi-layer substrate in a split-level architecture. Each of the antenna element modules can include a dielectric substrate having a feed (e.g., a slot or a pair of orthogonally arranged slots) integrated with or disposed on an upper side of the dielectric substrate. Each of the antenna element modules can include an embedded integrated circuit (IC) chip that is mounted on a lower side of the dielectric substrate. Each IC chip can include circuitry for adjusting (e.g., amplifying, filtering and/or phase shifting) a signal communicated between the feed element and circuitry in the multi-layer substrate. The IC chip can be coupled to the corresponding feed through the dielectric substrate. An antenna package can be adhered to the upper surface of the dielectric substrate. The antenna package can include a plastic antenna carrier and a radiating element (e.g., a parasitic element) embedded in the plastic antenna carrier. The plastic antenna carrier can include legs to space the radiating element from the feed integrated with or embedded in the upper surface of the dielectric substrate. In this manner, the radiating element overlies the feed, such that the radiating element and the feed operate in concert to provide an antenna element for the phased array antenna.

The multi-layer substrate underlies the array of antenna element modules. The multi-layer substrate can include a beam-forming network (BFN) circuit formed on a layer of the multi-layer substrate. The BFN circuit can be in electrical communication with the IC chip of each of the array of antenna element modules.

The phased array antenna described herein allows for modular design and fabrication. In particular, each of the antenna element modules can be designed and/or fabricated at a separate time and/or facility from the multi-layer substrate. This modular design and/or fabrication can allow for lower cost and higher performance of the resultant phased array antenna. For instance, to curtail costs, the antenna package can be formed with injection molding and/or thermo molding techniques. Similarly, each antenna element module can be packaged with flip chip techniques.

Figure 1:
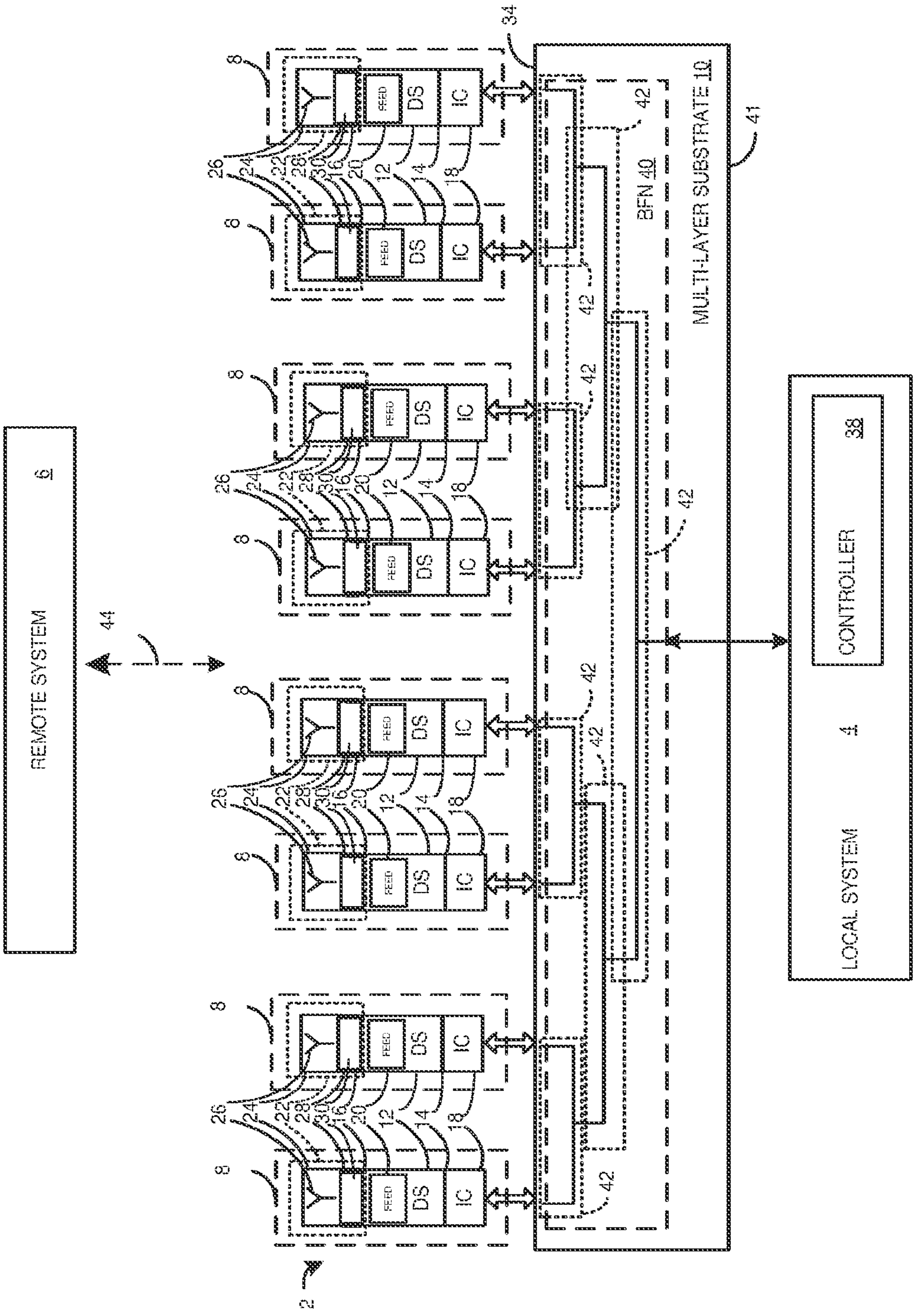
FIG. 1 illustrates a block diagram of an example phased array antenna with a split-level architecture.

FIG. 1 illustrates a block diagram of an example phased array antenna 2. The phased array antenna 2 facilitates wireless communication between a local system 4 and a remote system 6. The local system 4 can be wired to the phased array antenna 2. As some examples, the local system 4 can be implemented on a terrestrial station or an airborne station (e.g., an aircraft or satellite). Additionally, the phased array antenna 2 can be in wireless communication with the remote system 6. The remote system 6 can be an airborne station (e.g., an aircraft or satellite). Alternatively, the remote system 6 can be a terrestrial station. The local system 4 and the remote system 6 can be representative of computing systems (e.g., servers) and/or routers that can process, transmit and receive data.

The phased array antenna 2 can have a split-level architecture. In particular, the phased array antenna 2 can include a plurality of antenna element modules 8 that can be mounted on a multi-layer substrate 10. The multi-layer substrate 10 can be implemented, for example, as a multi-layer circuit board with multiple layers of circuit board materials (e.g., dielectric materials, electrically conductive materials, etc.).

Each antenna element module 8 can include a dielectric substrate 12. The dielectric substrate 12 can be implemented as a single or multi-layer circuit board, a wide-angle impedance matching metamaterial (WAIM), etc. The dielectric substrate 12 can include a lower surface 14 and an upper surface 16. Each antenna element module 8 can include an IC chip 18 adhered to the lower surface 14 of the dielectric substrate 12. Moreover, a feed 20 can be disposed on or integrated with the upper surface 16 of the dielectric substrate 12. Each antenna element module 8 can further include an antenna package 22. The antenna package 22 can include a plastic antenna carrier 24 with a radiating element 26 disposed on the plastic antenna carrier or embedded in a cavity of the plastic antenna carrier 24. In some examples, the plastic antenna carrier 24 can include one or more features extending to the upper surface 16 of the dielectric substrate 12. These one or more features can space a body portion of the plastic antenna carrier apart from the upper surface 16 of the dielectric substrate 12. In some examples, these one or more features can be implemented as legs 28 . . . . These one or more features can define an air gap 30 (or a void) that separates the radiating element 26 from the feed 20. In other examples, the one or more features (e.g., the legs 28) can be omitted, such that the body portion of the plastic antenna carrier 24 contacts the upper surface 16 of the dielectric substrate 12.

In some examples, each feed 20 can be implemented as a type of microstrip element (e.g., a slot or a pair of orthogonally arranged slot) formed on a top layer or embedded in the dielectric substrate 12. Each radiating element 26 can be implemented as a patch antenna (e.g., a round or rectangular patch antenna element). Each antenna element module 8 can be adhered (mounted) on a top surface 34 of the multi-layer substrate 10. In some examples, each antenna element module 8 can include a feedline extending through the dielectric substrate 12 that couples (e.g., a direct connection, passively coupled, etc.) the IC chip 18 with the feed 20. Moreover, each feed 20 of FIG. 1 can be a single feed, such that there is an equal number of IC chips 18 and feeds 20 across the phased array antenna 2. Alternatively, each feed 20 of FIG. 1 can be a plurality of feeds, such as a pair of orthogonally arranged slots, wherein each IC chip 18 can include multiple circuits for individually adjusting signals communicated between the feed 20 and the IC chip 18.

For purposes of simplification of explanation, the terms “top” and “bottom” are employed throughout this disclosure to denote opposing surfaces in a selected orientation. Similarly, the terms “upper” and “lower” are employed to denote relative positions in the selected orientation. Further, the terms “underlying” and “overlay” (as well as derivative words) are employed to denote a relative position of two adjacent surfaces or elements in the selected orientation. In fact, the examples used throughout this disclosure denote one selected orientation. However, in the described examples, the selected orientation is arbitrary, and other orientations are possible (e.g., upside down, rotated by 90 degrees, etc.) within the scope of the present disclosure.

The multi-layer substrate 10 can include a BFN circuit 40. The BFN circuit 40 can be formed on a layer (or layers) of the multi-layer substrate 10. In some examples, the BFN circuit 40 can be formed on an interior layer of the multi-layer substrate 10. In other examples, the BFN circuit 40 can be formed on an exterior layer, such as a top layer or bottom layer. As described herein, the BFN circuit 40 operates as a combiner and/or divider circuit that combines and/or divides signals in-phase. In some examples, the BFN circuit 40 can be a passive circuit. As used herein, the term “passive circuit” indicates that the BFN circuit 40 can include circuit components, (e.g., resistive traces, capacitors and/or inductors) that that are not supplied power from a power supply. The BFN circuit 40 can be in electrical communication with the IC chip 14 of each antenna element module 8.

The local system 4 can include a controller 38 that can control an operating mode of the phased array antenna 2. As one example, the controller 38 can be implemented as a microcontroller with embedded instructions. In another example, the controller 38 can be implemented as a computing device with a processing unit (e.g., one or more processor cores) that executes machine code stored in a non-transitory memory. In some examples, the controller 38 can provide control signals via control lines (not shown) to the IC chips 18, wherein such control signals cause the IC chips 18 to set an amplitude and/or phase adjustment level of signals communicated between the BFN circuit 40 and the feeds 20 of the antenna element modules 8. That is, the controller 38 can control the signal adjustment of the IC chips 18. Additionally or alternatively, in some examples, the controller 38 can provide control signals to the IC chips 18 that cause the phased array antenna 2 to operate in a receiving mode or in a transmitting mode. Additionally, for purposes of simplification of explanation, in examples described herein, the controller 38 also provides power signals to the IC chips 18 of the antenna element modules 8. However, in other examples, other sources can provide power for the IC chips 14.

In operation, in some examples, the phased array antenna 2 architecture can be designed to operate exclusively in the receiving mode or the transmitting mode. In other examples, as described herein, the phased array antenna 2 architecture can be designed to operate in half-duplex mode or polarization duplex mode, wherein the phased array antenna 2 switches between the receiving mode and the transmitting mode. In still other examples, the phased array antenna 2 architecture can be designed to operate in a frequency division multiplexing mode, such that the phased array antenna 2 can operate in the receiving mode and the transmitting mode concurrently.

In the receiving mode, electromagnetic (EM) signals can be received from the remote system 6 by the radiating elements 26 on each of the plurality of antenna element modules 8, or some subset thereof. The radiating elements 26 can couple the received EM signals through the air gap 30 and to a corresponding feed 20. The corresponding feed 20 can convert the received EM signals into electrical signals and provide the electrical signals to a corresponding IC chip 18 of a respective antenna element module 8. Each corresponding IC chip 18 can include circuitry that can adjust the received electrical signals to output an element signal. In particular, each IC chip 14 can amplify, filter and/or phase shift the received electrical signals to form the element signal.

Moreover, different IC chips 18 can provide different levels and types of adjustment. For example, a first IC chip 18 of a first antenna element module 8 can amplify the received signal with a first gain and/or phase shift the received electrical signals by a first phase shift. Additionally, a second IC chip 14 of a second antenna element module 8 can amplify the received electrical signals with a second gain and/or phase shift the received electrical signals by a second phase shift. In this manner, the plurality of element signals output by the IC chips 18 can have specific properties to facilitate combination by the BEN circuit 40.

Each of the element signals output by the IC chips 18 can be provided to the BFN circuit 40. The BFN circuit 40 can combine the element signals to form a received beam signal. The received beam signal can be provided to the local system 4 through a connection port that can be located at a bottom surface 41 of the multi-layer substrate 10, or other location. The local system 4 can process (e.g., demodulate) the received beam signal and consume decoded data.

The BFN circuit 40 can be implemented with stages of combiner/divider circuits 42, illustrated in FIG. 1 as split lines. In the example illustrated in FIG. 1, there are three (3) such stages, but in other examples, there can be more stages or fewer stages (as few as one (1) stage) of combiner/divider circuits 42. Each combiner/divider circuit 42 can be implemented as a power combiner/divider circuit, such as a Wilkinson power divider, a hybrid coupler, a directional coupler, or any other circuit that can combine and/or divide signals. Each combiner/divider circuit 42 can combine or divide signals passing through the BFN circuit 40. For instance, when used for receiving, signals communicated between the IC chips 14 and the local system 4 can be combined by each stage of the combiner/divider circuits 42. Additionally or alternatively, when used for transmitting, signals communicated from the local system 4 to the IC chips 14 can be divided by each stage of the combiner/divider circuit 42 of the BFN circuit 40. As some examples, the BFN circuit 40 can combine the element signals in-phase or out of phase. Additionally or alternatively, the BFN circuit 40 can combine the element signals equally or unequally. In general, the architecture of the BFN circuit 40 can be designed for nearly any form of signal combining and/or dividing.

In the transmitting mode, the local system 4 can provide a transmit beam signal to the BFN circuit 40 that is intended to be transmitted to the remote system 6. The BFN circuit 40 divides the transmit beam signal to form a plurality of divided signals, which are referred to as element signals. The element signals can be provided to the IC chips 18 of the antenna element modules 8. Each IC chip 18 can adjust (e.g., amplify, filter and/or phase shift) a received element signal, and outputs an adjusted signal for a corresponding feed 20. In the transmitting mode, each IC chip 18 can be configured to provide a different level of adjustment than the adjustment in the receiving mode, including examples where the phased array antenna 2 operates in the receiving mode and the transmitting mode concurrently. For example, a given IC chip 18 can provide a different level of gain, a different phase shift and/or a different passband in the transmitting mode than in the receiving mode.

The feed 20 of each antenna element module 8 can convert the adjusted element signal provided by the corresponding IC chip 14 into an EM signal that is provided through the air gap 30 toward the corresponding radiating element 26. Each radiating element 26 can couple the transmitted EM signal into free space, such that the transmitted EM signal is superimposed with the transmissions of the other antenna element modules 8 to form a beam of the transmit beam signal that propagates through the free space to the remote system 6, as indicated by an arrow 44. The remote system 6 can demodulate the received transmit beam signal and process resulting data. The phased array antenna 2 can be designed such that the transmit signals constructively and destructively interfere to produce the beam of the transmit beam signal with a radiation pattern having desired properties (e.g., a desired direction of maximum gain, and/or polarization). Additionally, in some examples, the adjustment (e.g., amplification and/or phase shift) by the plurality of IC chips 18 of each antenna element module 8 can be controllable by the controller 38 to couple the beam of the transmit beam signal in a desired direction. In examples where the phased array antenna 2 is designed to operate in the receiving mode and the transmitting mode, bi-directional wireless communication between the remote system 6 and the local system 4 can be established. Alternatively, in examples where the phased array antenna 2 is designed operate in only the receiving mode or only the transmitting mode, unidirectional wireless communication between the remote system 6 and the local system 4 can be established.

By implementing the phased array antenna 2 of FIG. 1, a relatively simple, low cost phased array antenna can be fabricated. In particular, the antenna element modules 8 can be fabricated separately from the multi-layer substrate 10, and mounted on the multi-layer substrate 10. Moreover, as explained herein in detail, the antenna element modules 8 can be fabricated as an array of antenna element modules that can be singulated and adhered to the top surface 34 of the multi-layer substrate 10.

Furthermore, the antenna element modules 8 can be fabricated with a relatively simple and low cost process. For example, the antenna packages 22 can be formed with an injection molding or a thermo molding process. In an example where the antenna packages 22 can be formed with injection molding, the plastic antenna carrier 24 of a given antenna package 22 can be formed with injection of a first polymer (e.g., a first type of plastic) into a mold that can include a cavity shaped for the radiating element 26. Subsequently, a second polymer (e.g., a second type of plastic) can be injected to the cavity of plastic antenna carrier 24 to form the antenna package 22. Additionally, the IC chip 18 can be attached to the lower surface 14 of the dielectric substrate 12. The antenna package 22 can subsequently be adhered to the top surface of the dielectric substrate 12.

Additionally, by implementing the IC chips 18 in the antenna element modules 8, the need for IC chips within the BEN circuit 40 and/or the bottom surface 41 of the multi-layer substrate 10 is obviated, thereby reducing the complexity of the BFN circuit 40. For example, inclusion of the IC chips 18 in the antenna element modules 8, avoids printed circuit board (PCB) complexities arising from routing a received signal through the multi-layer substrate 10 to an IC chip mounted on an opposing (bottom) surface, and then to the BFN circuit 40 for combining. Further still, including both the feed 20 and the radiating element 26 increases directivity and gain of the phased array antenna 2.

Figure 2:
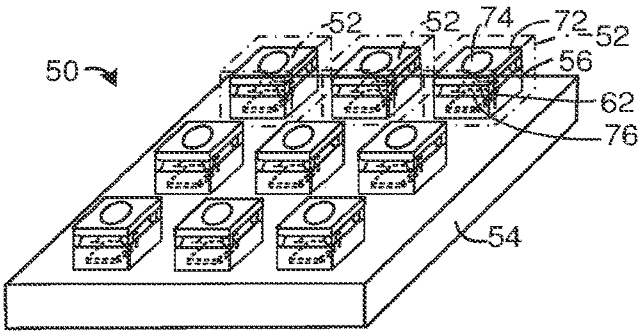
FIG. 2 illustrates a plan view of an example phased array antenna with a split-level architecture.
Figure 3:
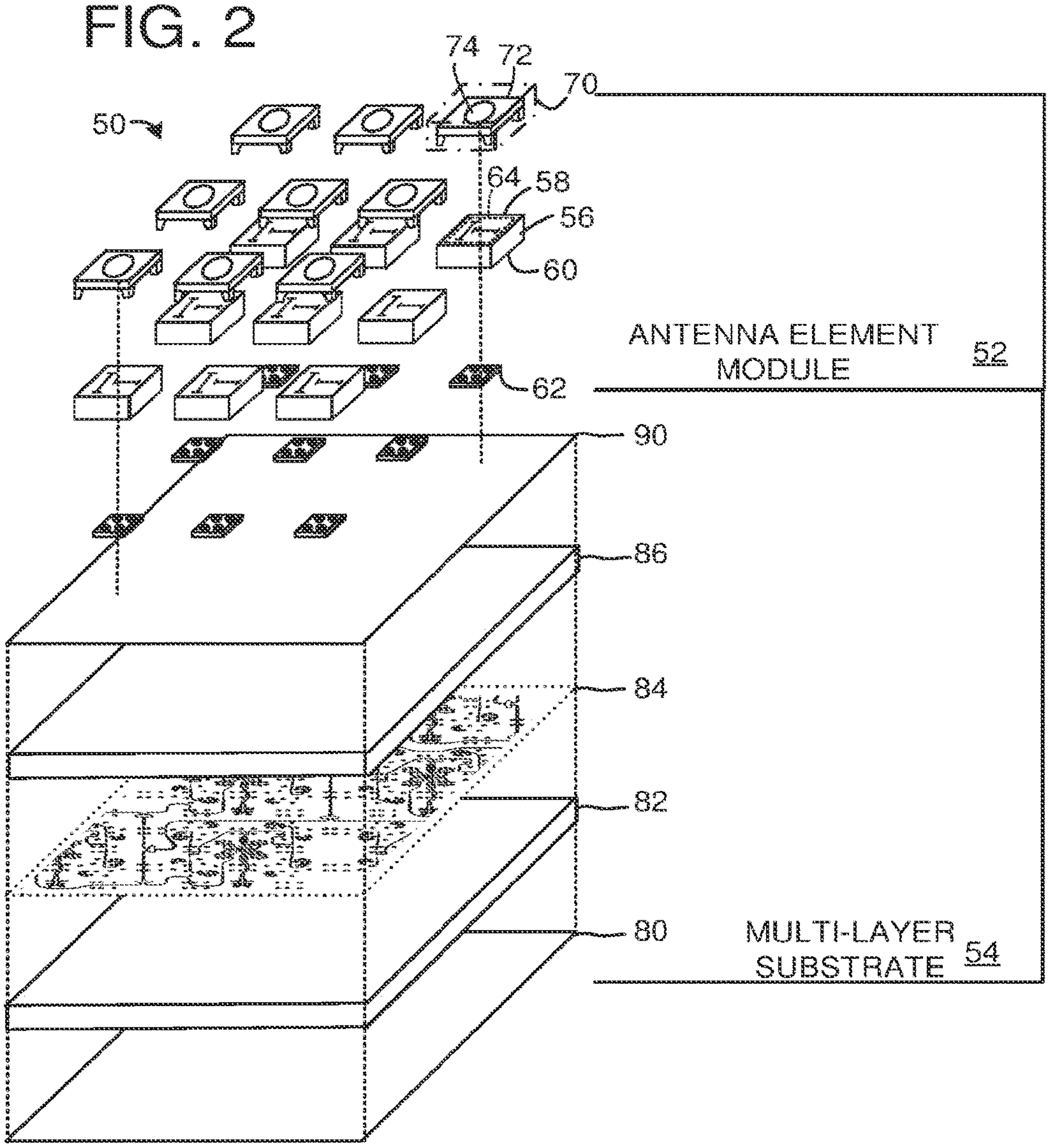
FIG. 3 illustrates an exploded view of the example phased array antenna of FIG. 2.

FIG. 2 is a perspective view of an example phased array antenna 50 with a split-level architecture for transmitting and/or receiving EM signals such as RF signals. FIG. 3 is an exploded diagram of the phased array antenna 50. FIGS. 2 and 3 employ the same reference numbers to denote the same structure. Moreover, unless noted otherwise, reference to elements of the phased array antenna 50 applies to both FIGS. 2 and 3. The phased array antenna 50 of FIGS. 2 and 3 can be employed to implement the phased array antenna 2 of FIG. 1.

In some examples, the phased array antenna 50 can be fabricated as modules and assembled. In particular, the phased array antenna 50 can include N number of antenna element modules 52 (only some of which are labeled in detail in FIGS. 1 and 2) mounted on a multi-layer substrate 54. Each antenna element module 52 can include a dielectric substrate 56 with an upper surface 58 and a lower surface 60. The dielectric substrate 56 can include one or more layers and can be implemented, for example, as a circuit board or a WAIM.

A plurality of IC chips 62 embedded in the phased array antenna 50 can be positioned on an intermediate layer of the phased array antenna 50. An IC chip 62 of the plurality of IC chips 62 can be adhered (mounted) on each of the antenna element modules 52. In particular, the IC chip 62 can be adhered on the lower surface 60 of each dielectric substrate 56. Each IC chip 62 can be adhered on a dielectric substrate 56 of a corresponding antenna element module 52 using flip-chip soldering techniques, wire bonding, such as thermionic bonding techniques or other techniques.

Additionally, each antenna element module 52 can include a feed 64. In some examples, the feed 64 can be disposed on the upper surface 58 of the dielectric substrate 56. In other examples, the feed 64 can be integrated with the dielectric substrate 56. In some examples, an embedded feedline (or multiple feedlines) extending through the dielectric substrate 56 can interconnect the feed 64 and the IC chip 62. In some examples, the feed 64 can be implemented as a microstrip element, such as a slot fabricated on the dielectric substrate 56 via metallization. Additionally, in some examples, the feed 64 can be representative of multiple microstrip elements. For example, the feed 64 can be representative of a pair of orthogonally arranged slots. In such a situation, the corresponding IC chip 62 can include multiple circuit paths (with multiple circuit elements) to individually adjust signals communicated with each of the corresponding multiple feeds 64. Alternatively, in some examples, the feed 64 can be representative of a single radiating element. In this situation, there is a one-to-one correspondence between IC chips 62 and feeds 64.

Additionally, each antenna element module 52 can include an antenna package 70 that is adhered to the upper surface 58 of the dielectric substrate 56. More particularly, the antenna package 70 can include a plastic antenna carrier 72. The plastic antenna carrier 72 can include a body portion and legs (e.g., three or more legs) extending from the body portion. As used herein, the term "plastic" refers to any of numerous organic synthetic or processed materials that are mostly thermoplastic or thermosetting polymers of high molecular weight and that can be made into objects, films, or filaments. The body portion of the plastic antenna carrier 72 can include a cavity having a radiating element 74 positioned in the cavity. The cavity can be a recess or a hole in the plastic antenna carrier 72. The radiating element 74 can be implemented as a patch antenna, such as a round patch antenna or a polygonal patch antenna (e.g., a rectangular patch antenna or a hexagonal patch antenna).

In some examples, the radiating element 74 can be coupled to a parasitic element 76 that is disposed on or integrated with a lower surface of the plastic antenna carrier 72.

The legs of the plastic antenna carrier 72 space apart the cavity in the body portion of the plastic antenna carrier 72 from the upper surface 58 of the dielectric substrate 56. More particularly, the legs of the plastic antenna carrier 72 establish an air gap 76 (or void) apart the feed 64 from the radiating element 74 . . . . In this manner, the feed 64 and the radiating element 74 operate in concert to form an antenna element.

The multi-layer substrate 54 can be implemented, for example, as a multi-layer circuit board (e.g., as a lower circuit board). In some examples, the multi-layer substrate 54 can include a base conductive layer 80 (e.g., a ground plane) located at a bottom (or lowest layer) of the multi-layer substrate 54. The base conductive layer 80 can include etchings and/or traces that allow the multi-layer substrate 54 to communicate with external components, such as a local system with a controller and/or a power supply. A lower dielectric layer 82 overlays the base conductive layer 80. A BFN circuit 84 can be formed on a layer of the multi-layer substrate 54 (or multiple layers). In some examples, the BFN circuit 84 can be formed on an interior layer of the multi-layer substrate 54. In an example where the BFN circuit 84 is formed on an interior layer, the BFN circuit 84 can overlay the lower dielectric layer 82. Moreover, an upper dielectric layer 86 can overlay the BFN circuit 84. In this manner, the BFN circuit 84 can be sandwiched between the lower dielectric layer 82 and the upper dielectric layer 86, such that the BEN circuit 84 can be electrically shielded from electromagnetic interference (EMI). A top conductive layer 90 can overlay the upper dielectric layer 86. In other examples, the BFN circuit 84 can be formed at or near the upper dielectric layer 86 of the multi-layer substrate 54. In such a situation, the BFN circuit 84 can be patterned in the top conductive layer 90.

The top conductive layer 90 can include patterned mounting interfaces (e.g., etchings and/or conductive pads) for receiving each of the N number of antenna element modules 52. Additionally, the top conductive layer 90 can include patterned conductive interfaces with vias to permit passage of signals between the BFN circuit 84 and the IC chips 62 and/or the dielectric substrates 56 of the N number of antenna element modules 52. The N number of antenna element modules 52 can be mounted on the top conductive layer 90 at the pattern mounting interfaces of the top conductive layer 90. In some examples, the N number of antenna element modules 52 can be arranged in an ordered array, such as in a lattice of the phased array antenna 50. In some examples, as explained in detail herein, each IC chip 62 can be mounted on the top conductive layer 90 with an electrical bonding material (e.g., solder). In other examples, the lower surface 60 of each dielectric substrate 56 can be mounted on the top conductive layer 90 with an electrical bonding material, and a traces and/or vias in each dielectric substrate 56 can couple a corresponding IC chip 62 to a connection pad on the top conductive layer 90.

The multi-layer substrate 54 can include vias extending therethrough for connecting components at different layers of the multi-layer substrate. 54. For instance, if the BFN circuit 84 can be formed on an interior layer of the multi-layer substrate 54, the multi-layer substrate 54 can include vias for electrically connecting the BFN circuit 84 to the antenna element modules 52. Such vias can be coupled to the BEN circuit 84 at signal interfaces to couple the antenna element modules 52 to the BFN circuit 84.

In some examples, the BFN circuit 84 can be a passive circuit. The BFN circuit 84 can be configured to divide/combine signals that can be communicated between the N number of antenna element modules 52 and an external component of the local system.

Additionally, each IC chip 62 of each antenna element module 52 can include circuit components to adjust a signal communicated between the feed 64 and the BFN circuit 84. In particular, each antenna element module 52 can filter, amplify and/or phase shift a signal communicated between the feed 64 and the BFN circuit 84. Moreover, in some examples, each IC chip 62 can be tuned for a particular corresponding feed 64. That is, a first IC chip 62 can be configured to apply a different gain and/or phase shift to a signal than a second IC chip 62. Additionally or alternatively, adjustment parameters (e.g., bandpass, gain and/or phase shift) of each IC chip 62 can be set by a controller operating at the local system.

As explained with respect to the phased array antenna 2 of FIG. 1, in one example, the phased array antenna 50 can operate in transmitting mode. Additionally or alternatively, the phased array antenna 50 can operate in receiving mode. In some examples, the phased array antenna 50 can be configured to operate in the receiving mode or transmitting mode exclusively. In other examples, the phased array antenna 50 can operate in half-duplex mode or polarization mode, switching between the receiving mode and the transmitting mode. In still other examples, the phased array antenna 50 can operate in a frequency division duplex mode, wherein the phased array antenna 50 can operate in the transmitting mode and the receiving mode concurrently.

By implementing the phased array antenna 50, a relatively simple, low cost phased array antenna can be provided. In particular, the split-level architecture of the phased array antenna 50 reduces the number of layers needed to implement the multi-layer substrate 54. The split-level architecture of the phased array antenna 50 can permit each dielectric substrate 56 and the multi-layer substrate 54 to have a relatively low complexity (e.g., blind vias can be avoided), and thus the entire phased array antenna 50 can be lower cost as compared to use of a single circuit board. Additionally, integration of the IC chips 62 with antenna element module 52 positions the IC chips 62 in relatively close proximity with the feeds 64. Accordingly, via lengths between the IC chips 62 and the feeds 64 can be reduced.

Additionally, by reducing the complexity of the multi-layer substrate 54, simple, inexpensive techniques can be employed to fabricate the antenna element modules 52. In particular, each of the antenna element modules 52 can be fabricated with standard processing and packaging technique, such as injection molding, thermo molding and flip chip processing.

Additionally, by arranging the IC chips 62 separate from the multi-layer substrate 54, the number of vias needed to implement the phased array antenna 50 can be curtailed, such that the density of the vias within the multi-layer substrate 54 can be reduced. Accordingly, this reduces and/or eliminates the need to backdrill the vias with (with relatively complicated and expensive) controlled depth drilling techniques. Furthermore, as noted above, each antenna element module 52 can be mounted on patterned conductive interfaces of the top conductive layer 90 of the multi-layer substrate 54. The pattern of the top conductive layer 90 defines locations of the N number of antenna element modules 52. Accordingly, the N number of antenna element modules 52 can be fabricated at a different time and/or facility from the multi-layer substrate 54.

Moreover, in the arrangement of the antenna element modules 52 on the top conductive layer 90 of the multi-layer substrate 54, each of the antenna element modules 52 can be separated with free space (e.g., air or a void), which avoids a continuous dielectric material between the feeds 64. In this manner, unwanted surface wave propagation of signals is suppressed/curtailed (reduced and/or eliminated), thereby elevating a performance (signal to noise ratio) of the phased array antenna 50. For example, surface waves that would otherwise propagate parallel with a continuous surface of dielectric material can be suppressed/curtailed. In particular, the pattern of the top conductive layer 90 ensures that a free space gap separates each IC chip 62. These free space gaps introduce index of refraction discontinuities in the top conductive layer 90 between the IC chips 62. These indices of refraction discontinuities reduce the propagation of surface waves across the top conductive layer 90.

Figure 4:
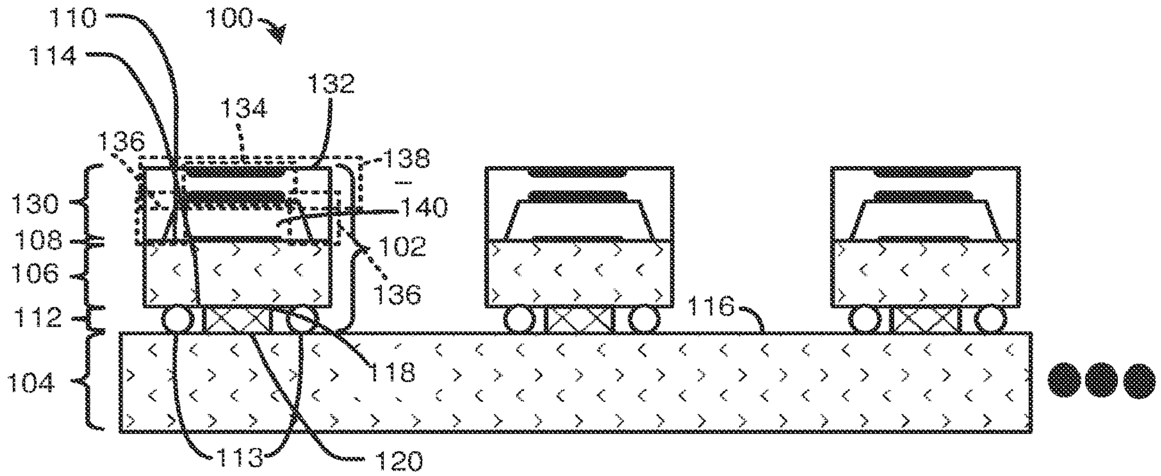
FIG. 4 illustrates a portion of an example phased array antenna with a first architecture.

FIG. 4 illustrates a portion of an example phased array antenna 100 with an example architecture for mounting a plurality of antenna element modules 102 on a multi-layer substrate 104. The phased array antenna 100 can be employed to implement the phased array antenna 2 of FIG. 1 and/or the phased array antenna 50 of FIGS. 2 and 3. Each antenna element module 102 can include a dielectric substrate 106 with a feed 108 disposed on or integrated with a top surface 110 of the dielectric substrate 106. Each feed 108 can be implemented, for example, as a slot or as a pair of orthogonally arranged slots.

As one example, an IC chip 112 can be adhered (mounted) to a lower surface 114 of the dielectric substrate 106. In other examples, the IC chip 112 can be adhered to a different surface of the dielectric substrate 106. Each IC chip 112 can also be adhered to a top surface 116 (e.g., a conductive layer) of the multi-layer substrate 104. Each IC chip 112 can be adhered to the top surface 116 of the multi-layer substrate 104 via an electrical bonding material 113 (e.g., solder balls). The multi-layer substrate 104 can include circuits such as a BFN circuit. Additionally, the multi-layer substrate 104 can be coupled to power circuits and/or controllers that can provide signals to the IC chips 112. In some examples, each IC chip 112 can include an upper IC chip interface indicated at 118 that can provide a signal interface between the dielectric substrate 106 and the IC chip 112. Additionally, each IC chip 112 can include a lower IC chip interface 120 that can provide a signal interface between the IC chip 112 and the multi-layer substrate 104.

The IC chips 112 can include one or more through-chip vias (e.g., through-silicon vias (TSVs)) that pass completely through the IC chips 112 to provide conductive interfaces at both interfaces 118, 120. In some examples, the lower IC chip interface 120 can be coupled to circuits in the multi-layer substrate 104 (such as a BFN circuit) through vias. For instance, a solder joint between solder pads on the top surface 116 of the multi-layer substrate 104 and each IC chip 112 can provide the direct electrical connection. In this manner, each IC chip 112 can be directly coupled to the multi-layer substrate 104. In operation, each IC chip 112 interposes signals communicated between a corresponding feed 108 and the multi-layer substrate (including the BFN circuit) 104. Specifically, the signals communicated between each IC chip 112 and the multi-layer substrate 104 can pass through the lower IC chip interface 120. Additionally, the signals communicated between the IC chip 112 and the feed 108 can pass through the upper IC chip interface 118. Each IC chip 112 can adjust (e.g., amplify, filter and/or phase shift) signals communicated between the multi-layer substrate 104 and the dielectric substrate 106.

Furthermore, each antenna element module 102 can also include an antenna package 130. Each antenna package 130 can include a plastic antenna carrier 132 and a radiating element 134. The plastic antenna carrier 132 can include one or more features such as legs 136 and a body portion 138. The radiating element 134 can be positioned in a cavity formed in the body portion 138 of the plastic antenna carrier 132. In some examples, the radiating element 134 can be a single antenna element, such as a patch antenna. In other examples, the radiating element 134, as illustrated can be implemented with a plurality of radiating elements, such as a pair of patch antennas positioned in opposing sides of the body portion 138 of the plastic antenna carrier 132.

The legs 136 of the plastic antenna carrier 132 spaces the top surface 110 of the dielectric substrate 106 from the cavity in which the radiating element 134 resides. Moreover, in some examples, the legs 136 (or other features) can be omitted, such that the body portion 138 of the plastic antenna carrier contacts the top surface 110 of the dielectric substrate. The legs 136, if included, can be for, example, about 0.25 millimeters (mm) in length to about 2 mm in length. However, in other examples, the legs 136 could be longer or shorter than this range. Thus, the legs 136 form an air gap 140 (or void) between the feed 108 and the radiating element 134. In this manner, the feed 108 and the radiating element 134 can operate in concert as constituent components of an antenna element. In particular, signals communicated with the feed 108 can be coupled by the radiating element 134. For example, in a receiving mode, EM signals received from an external source can be coupled by the radiating element 134 toward the feed 108 and converted into electrical signals by the feed 108 for communication with the IC chip 112. Conversely, in a transmitting mode, signals communicated from the IC chip 112 to the feed 108 can be converted into EM signals by the feed 108 and propagated into free space by the radiating element 134.

By employment of the architecture illustrated for the phased array antenna 100 of FIG. 4, a direct electrical connection between the multi-layer substrate 104 and the IC chip 112 can be achieved. In this manner, the IC chips 112 of the antenna element modules 102 can be directly coupled to vias and/or traces connected the BEN circuit and/or power and control systems of the multi-layer substrate 104. The architecture of the phased array antenna 100 of FIG. 4 curtails losses by positioning each IC chip 112 in relatively close proximity to the feed 158 and the radiating element 172. Further, in some examples, such losses can be further curtailed by providing the direct electrical connection between the multi-layer substrate 104 and the IC chip 112.

Figure 5:
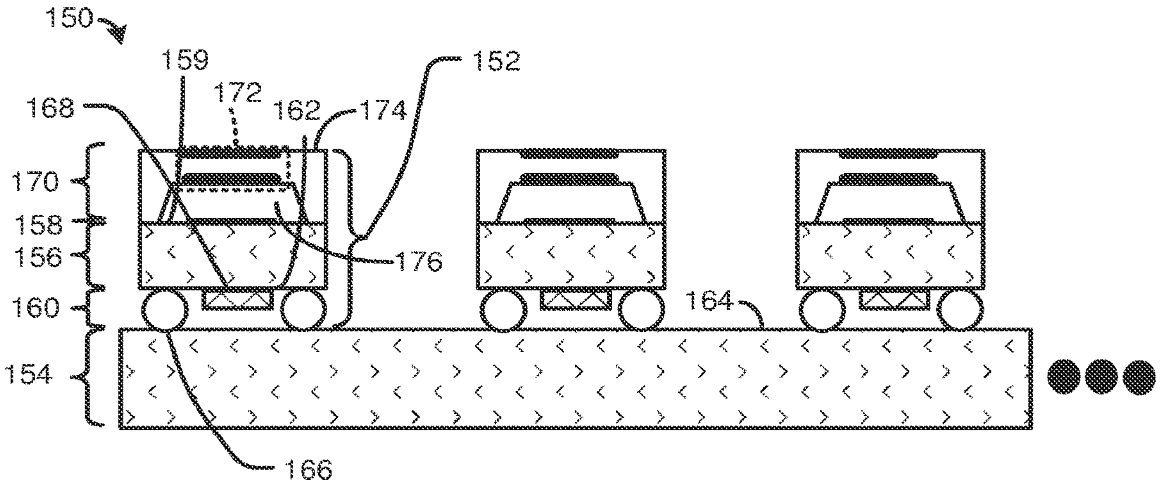
FIG. 5 illustrates a portion of an example phased array antenna with a second architecture.

FIG. 5 illustrates a portion of an example phased array antenna 150 with another example architecture for mounting a plurality of antenna element modules 152 on a multi-layer substrate 154. The phased array antenna 150 can be employed to implement the phased array antenna 2 of FIG. 1 and/or the phased array antenna 50 of FIGS. 2 and 3. Each antenna element module 152 can include a dielectric substrate 156 with a feed 158 disposed on or integrated with a top surface 159 of the dielectric substrate 156. Each feed 158 can be implemented, for example, as a slot or a pair of orthogonally arranged slots.

In some examples, an IC chip 160 can be mounted to a lower surface 162 of the dielectric substrate 156. In other examples, the IC chip 160 can be adhered to a different surface of the dielectric substrate 156. Each dielectric substrate 156 can be mounted to a top surface 164 (e.g., a conductive layer) of a multi-layer substrate 154 through a conductive bonding material 166, such as solder balls or pillars. Each IC chip 160 can be spaced apart from the top surface 164 of the multi-layer substrate 154. In other words, a free space gap (e.g., air or a void) can separate a surface of each IC chip 160 from the top surface 164 of the multi-layer substrate 154. Additionally, the amount of conductive bonding material 166 (e.g., a solder ball) can provide a desired spacing (e.g., a size of the free space gap) between the IC chips 160 and the multi-layer substrate 154. In some examples, each IC chip 160 can be circumscribed by a corresponding dielectric substrate 156. In such a situation, an electrical connection formed by the conductive bonding material 166 can be formed near a periphery of the corresponding dielectric substrate 156.

The multi-layer substrate 154 can include circuits such as a BFN circuit. Additionally, the multi-layer substrate 154 can be coupled to power circuits and/or controllers that can provide signals to the IC chips 160. In operation, each IC chip 160 can adjust (e.g., amplify, filter and/or phase shift) signals communicated between the multi-layer substrate 154 and the feed 158.

In some examples, each IC chip 160 can include an IC chip interface 168 that can provide a conductive interface between the dielectric substrate 156 and the IC chip 160. In some examples, each IC chip 160 can be flipped and attached to the lower surface 162 of the dielectric substrate 156. This architecture curtails losses by positioning the IC chip 160 in relatively close proximity to the feed 158. Additionally, the dielectric substrate 156 can include vias and/or traces that provide an electrical path between the multi-layer substrate 154 and the IC chip 160. In this manner, signals provided from the multi-layer substrate 154 to the IC chip 160 can be routed through the dielectric substrate 156. Specifically, signals communicated between the multi-layer substrate 154 and an IC chip 160 can pass through the conductive bonding material 166, through the vias and/or traces of the dielectric substrate 156 and through the IC chip interface 168. Additionally, signals communicated between the IC chip 160 and the feed 158 can pass through the IC chip interface 168 and through the dielectric substrate 156.

An antenna package 170 can be adhered to the top surface 159 of the dielectric substrate 156. The antenna package 170 can be implemented with the antenna package 130 of FIG. 4. Thus, the antenna package 170 can include a radiating element 172 positioned within a cavity of a plastic antenna carrier 174. The radiating element 172 can be spaced apart from the feed 158 by an air gap or void 176 that is formed by the plastic antenna carrier 174. In this manner, the feed 158 and the radiating element 172 can operate in concert as constituent components of an antenna element. In particular, signals communicated with the feed 158 can be coupled by the radiating element 172.

By employment of the architecture illustrated for the phased array antenna 150 of FIG. 5, an electrical path between the multi-layer substrate 154 and the IC chip 160 can be achieved with the single IC interface 168 on one side of the IC chip 160. By employment of the architecture illustrated for the phased array antenna 150 of FIG. 5, the IC chip 160 of each antenna element module 102 can be indirectly coupled to vias and/or traces connected to the BFN circuit and/or power and control systems of the multi-layer substrate 154.

Figure 6:
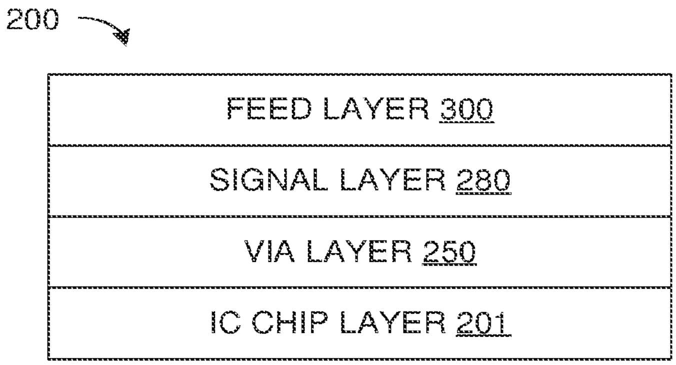
FIG. 6 illustrates a side cross-sectional view of a dielectric substrate for an antenna element module.

FIG. 6 illustrates a side cross-sectional view of a dielectric substrate 200, such as the dielectric substrate 106 of FIGS. 4 and 5. The dielectric substrate 200 can be employed in an antenna element module, such as the antenna element module 152 of the phased array antenna 150 of FIG. 5. The dielectric substrate 200 includes a plurality of stacked layers. The bottom layer of the dielectric substrate 200 can be implemented as an IC chip layer 201. The dielectric substrate 200 can include interior layers, such as a via layer 250 and a signal layer 280. The dielectric substrate 200 can further include top layer implemented as a feed layer 300. The layers listed in FIG. 6 are not meant to be exhaustive. For example, some layers, such an insulating (dielectric) layer and/or a ground plane layer are not illustrated for purposes of simplification of explanation.

Figure 7:
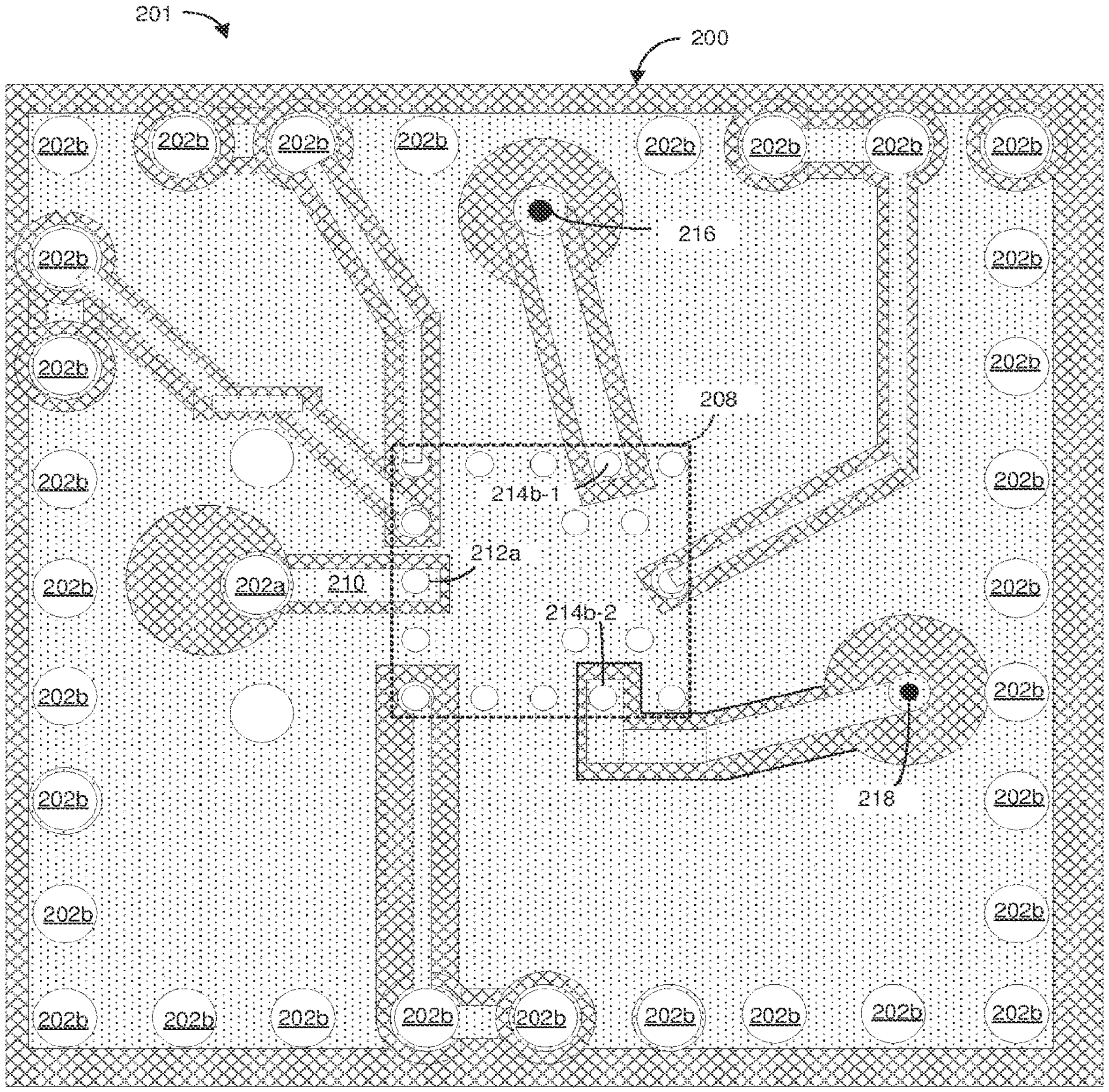
FIG. 7 illustrates a top view of an example of an integrated circuit (IC) chip layer of the dielectric substrate of FIG. 6.

FIG. 7 illustrates a top view of the IC chip layer 201 of FIG. 1 of an antenna element module, such as the antenna element module 152 of the phased array antenna 150 of FIG. 5. The IC chip layer 201 can be representative of a lower surface of a dielectric substrate 200. The illustrated example can include various groups of conductive bonding material 202 (e.g., solder balls, pillars, etc.) between the lower surface of the dielectric substrate 200 and the multi-layer substrate (not shown in FIG. 6; see FIG. 5 ref. no. 154).

The conductive bonding material 202 can be arranged in a ball grid array (BGA). In particular, in the illustrated example, conductive bonding material **202*b* is arranged along the periphery of the lower surface of the dielectric substrate 200. The conductive bonding material 206*b* can provide the desired spacing between an IC chip 208 and the multi-layer substrate as discussed above with respect to FIG. 5. Some or all of the conductive bonding material 206*b* can be coupled to ground to provide shielding of the IC chip 208 from external electromagnetic sources. As another example, one or more of the conductive bonding material 206*b* may be coupled to a supply voltage (or multiple supply voltages) that is used to provide power for the IC chip 208 through one or more conductive traces (not shown) coupled to a corresponding port of the IC chip 208. As yet another example, one or more of the conductive bonding material 202*b* may be coupled to a control line in the multi-layer substrate to provide control signals to the IC chip 208 through a conductive trace (not shown) coupled to a corresponding port of the IC chip. Although shown in the illustrated example as being arranged along the periphery, in other examples the conductive bonding material 202*b*** can be arranged in a different manner.

In the illustrated example, the electrical path for communication of signals between the multi-layer substrate and a port (e.g., a pad, lead, etc.) on the IC chip 208 is provided through a conductive bonding material 202*a*, a conductive trace 210, and conductive bonding material (e.g., solder, etc.) 212*a*. As such, the conductive bonding material 202*a* extends between the top surface of the multi-layer substrate to the conductive trace 210 (e.g., patterned metal material) on the bottom surface of the dielectric substrate 200. The conductive trace 210 extends between the conductive bonding material 202*a* and conductive bonding material 212*a* which is adhered to the port on the IC chip 208. Alternatively, the manner in which the electrical path is established can be different.

In the illustrated example, the electrical path for communication of signals between one or more ports of the IC chip 208 and the feed (not shown) is provided by conductive bonding material (e.g., solder) that extends between the bottom surface of the dielectric substrate 2200 and the upper surface of the IC chip 208. In the illustrated example, the feed can be implemented as orthogonally arranged slots having two ports and thus a first signal (e.g., corresponding to horizontal polarization) is communicated between a first port of the IC chip 208 and a first port 216 of the feed through conductive bonding material 214*b*-1, and a second signal (e.g., corresponding to vertical polarization) is communicated between a second port of the IC chip 208 and a second port 218 of the feed through conductive bonding material 214*b*-2. Alternatively, the manner in which the electrical path is established between the IC chip and feed can be different.

In the illustrated example, additional conductive bonding material is arranged along the periphery of the IC chip 208 to provide additional electrical paths between other ports on the IC chip 208 and the multi-layer substrate, such as to provide ground, DC supply voltage(s), etc. through conductive bonding material 202*b* and conductive traces (not shown) as mentioned above.

Figure 8A:
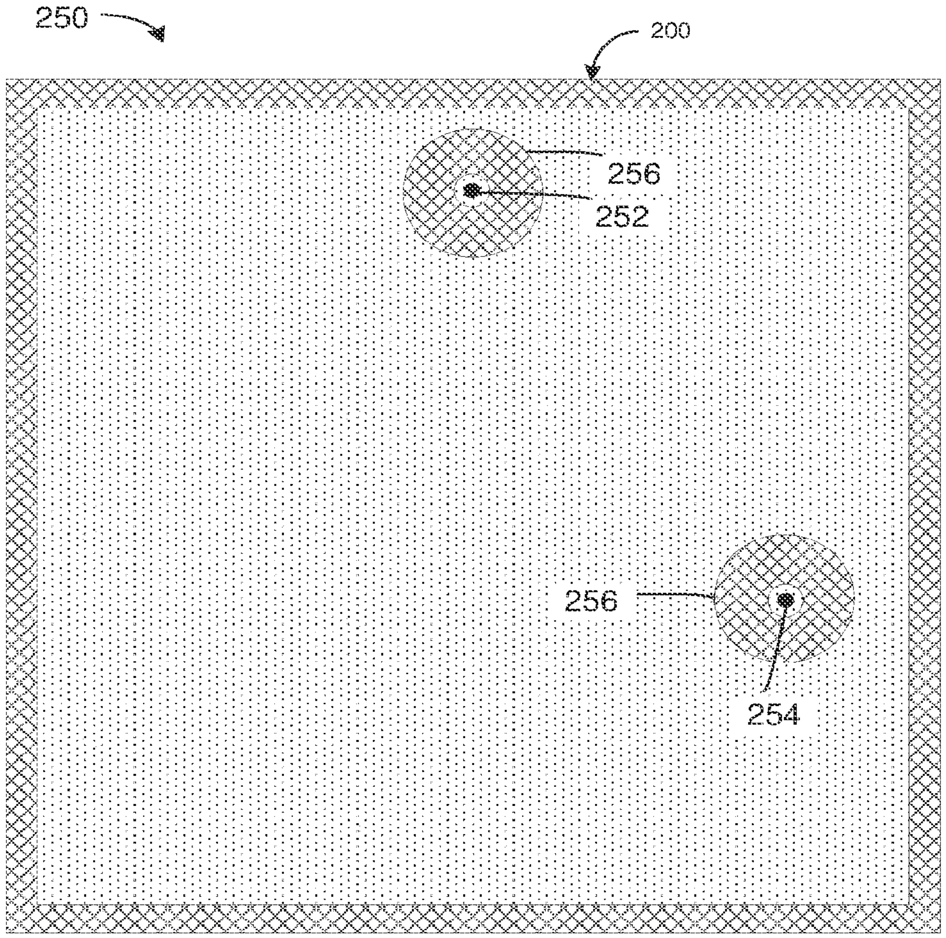
FIG. 8A illustrates an example of a via layer 250 of the dielectric substrate of FIG. 6.

FIG. 8A illustrates a top view an example of the via layer 250 (an interior layer) of the dielectric substrate 200 illustrated in FIG. 6 that can include a first via 252 and a second via 254 that can be coupled to the first port 216 and the second port 218 of FIG. 7, respectively of the IC chip layer 201 of the dielectric substrate 200. The via layer 250 can overlay the IC chip layer 201 of FIG. 7. Each of the first via 252 and the second via 254 can be circumscribed by a shielding region 256 formed of a non-conductive material.

Figure 8B:
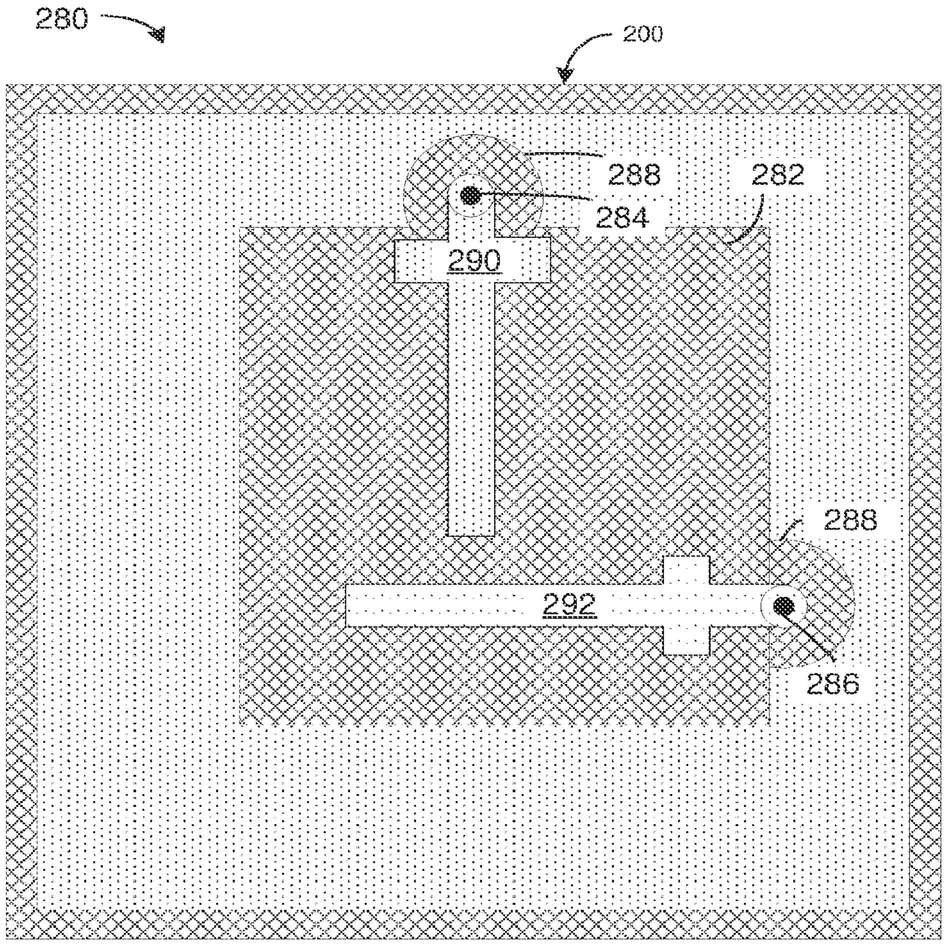
FIG. 8B illustrates a top view of an example of a signal layer of the dielectric substrate of FIG. 6.

FIG. 8B illustrates an example of the signal layer 280 (another interior layer) of the dielectric substrate 200 of FIG. 6 that can overlay the via layer 250 of FIG. 8A and the IC chip layer 201 of FIG. 7. The signal layer 280 can include an etched region 282. The signal layer 280 include a termination of a first via 284 and a termination of a second via 286. The termination of the first termination 284 can be coupled to the first via 252 of FIG. 8A and the first port 216 of FIG. 7. The termination of the second via 286 can be coupled to the second via 254 of FIG. 7 and the second port 218 of FIG. 7. Additionally, the termination of the first via 284 and the termination of the second via 286 can be partially circumscribed by a shielding region 288 formed of the non-conductive material.

The etched region 282 can be formed of a nonconductive material. Additionally, the etched region 282 can include a first microstrip line 290 and a second microstrip line 292 that can be each formed of conductive material (e.g., metal). The first microstrip line 290 and the second microstrip line 292 can be shaped to underlie a respective slot.

Figure 9:
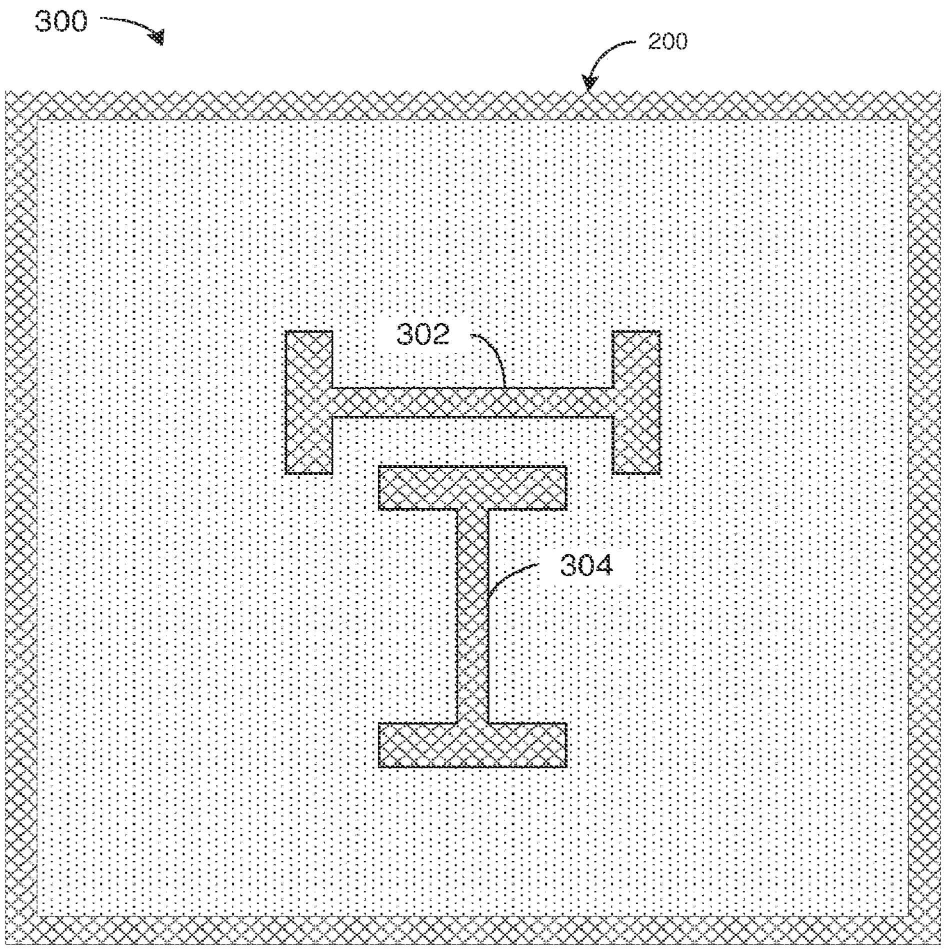
FIG. 9 illustrates a top view of an example of a feed layer of the dielectric substrate of FIG. 6.

FIG. 9 illustrates an example of a top view of the feed layer 300 of the dielectric substrate 200 illustrated in FIG. 6 that can overlay the signal layer 280 of FIG. 8B, the via layer 250 of FIG. 8A and the IC chip layer 201 of FIG. 7. The feed layer 300 can be disposed on or integrated with a top surface of the dielectric substrate 200. The feed layer 300 can overlay the signal layer 280, the via layer 250 of FIG. 8A and the IC chip layer 201 of FIG. 7. The feed layer 300 can include a first slot 302 and a second slot 304 that can be each formed within conductive material (e.g., metal). The first slot 302 and the second slot 304 can each be implemented as a component of a feed for an antenna element. Accordingly, the first slot 302 and the second slot 304 can be orthogonally arranged with respect to each other. Additionally, although two (2) slots are illustrated in FIG. 9, in other examples, there could be more or less slots in other examples.

FIGS. 10-19 depict examples of antenna packages. Moreover, FIGS. 10-19 employ the same reference numbers to denote the same structure. Moreover, for purposes of simplification of explanation, some reference numbers are not included and/or not reintroduced with respect to each figure.

Figure 10:
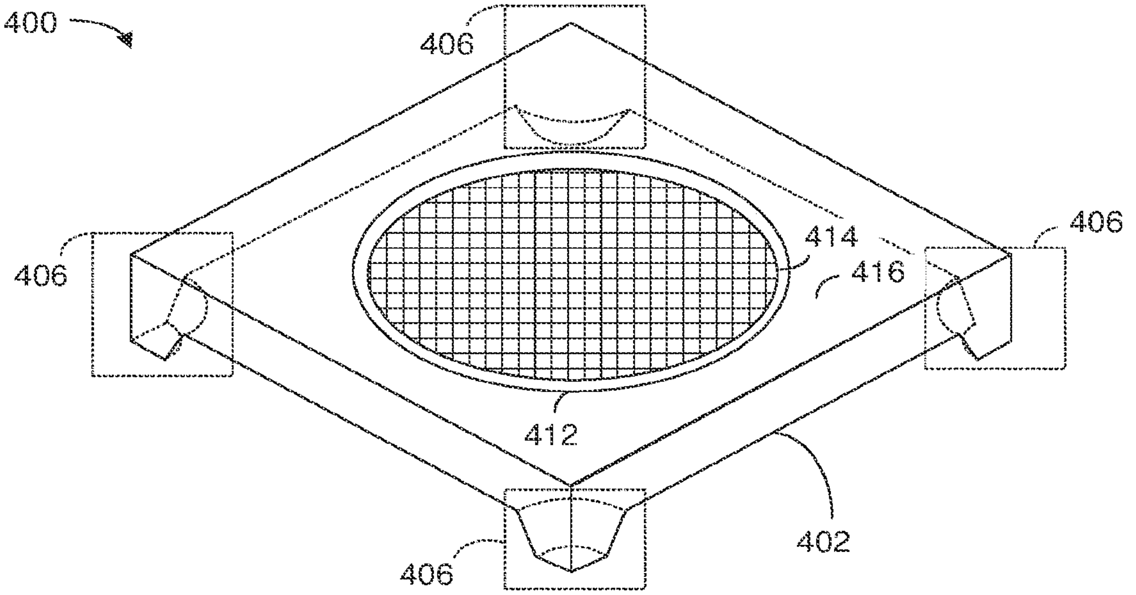
FIG. 10 illustrates a perspective view of an example of an antenna package with a first architecture.
Figure 11:
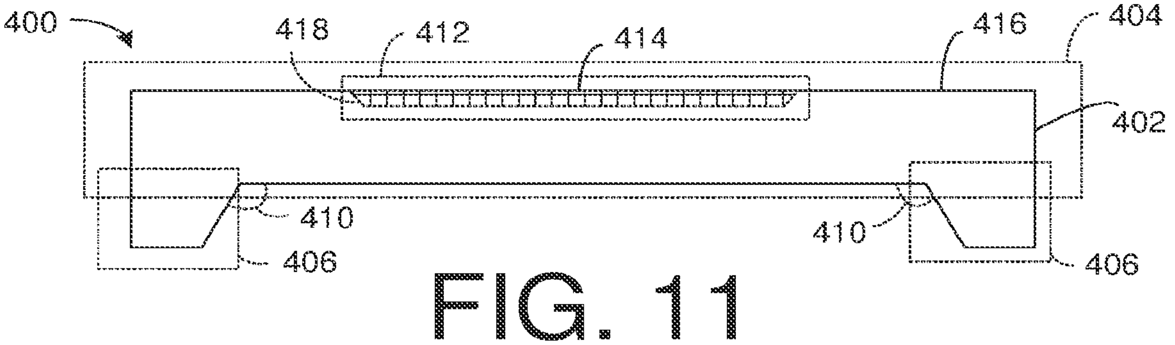
FIG. 11 illustrates a side view of the antenna package illustrated in FIG. 10.

FIG. 10 illustrates a perspective view of an example of an antenna package 400 and FIG. 11 illustrate a side view of the antenna package 400. FIGS. 10 and 11 employ the same reference numbers to denote the same structure. Moreover, unless noted otherwise, reference to elements of the antenna package 400 applies to both FIGS. 10 and 11. The antenna package 400 can be employed to implement the antenna package 22 of FIG. 1, the antenna package 70 of FIG. 2 and/or the antenna package 130 of FIG. 3.

The antenna package 400 can be formed with injection molding or thermo molding (also referred to as thermoforming) techniques. The antenna package 400 can include a plastic antenna carrier 402. The plastic antenna carrier 402 can include a body portion 404 and a plurality of legs 406 extending from the body portion 404. In the present example, the body portion 404 can have a rectangular base shape. However, in other examples, other base shapes are possible. More particularly, the body portion 404 can have a regular tile base shape (e.g., triangular, rectangular, hexagonal, etc.).

The legs 406 can be positioned at each vertex (e.g., corner) of the plastic antenna carrier 402. The legs 406 can have a length of about 0.25 mm to about 2 mm. Each leg can include at least one draft angle 410 that extends away from the body portion at a draft angle that is an obtuse angle. In some examples, the draft angle 410 can be an angle that is less than 90 degrees. The draft angle 410 can facilitate the injection molding or thermo molding techniques employed to fabricate the antenna package 400.

The body portion 404 can include a cavity 412 shaped for a radiating element 414. Thus, the cavity 412 can be implemented as a recess in a top surface of the body portion 404. In some examples, an edge surface 418 the cavity 412 can be formed with a draft angle (e.g., an angle less than 90 degrees) relative to the top surface 416 of the body portion 404. The radiating element 414 can be implemented as a patch antenna. As used herein, the term "patch antenna" refers to antenna with a low profile that is mounted on flat (or nearly flat) surface. A patch antenna incudes a flat sheet or patch of material mounted over a larger flat (or nearly flat) surface. The radiating element 414 can be positioned in the cavity 412. Thus, the cavity 412 can be shaped to envelop the radiating element 414 to form a coplanar surface with the top surface 416. In other examples, the radiating element 414 can extend beyond the top surface 416 of the body portion 404. In still other examples, the radiating element 414 can extend to a height below the top surface 416 of the body portion 404.

In some examples, the radiating element 414 can be formed or positioned in the cavity 412 through an electroplating or insert molding process. The radiating element 414 can be implemented with a low loss dielectric material, such as plastic. However, the plastic employed to fabricate the plastic antenna carrier 402 be a different type of plastic than the plastic employed to fabricate the radiating element 414.

As noted, the antenna package 400 can be designed to adhere to a top surface of a dielectric (e.g., the feed layer 300 of FIG. 9) that can include a feed (e.g., the first slot 302 and the second slot 304 illustrated on FIG. 9). Accordingly, the plastic antenna carrier 402 can be configured such that the legs 406 space the radiating element 414 from the feed, thereby forming an air gap or void between the radiating element 414 and the feed. In operation, the radiating element 414 couples EM waves between free space and the feed.

Figure 12:
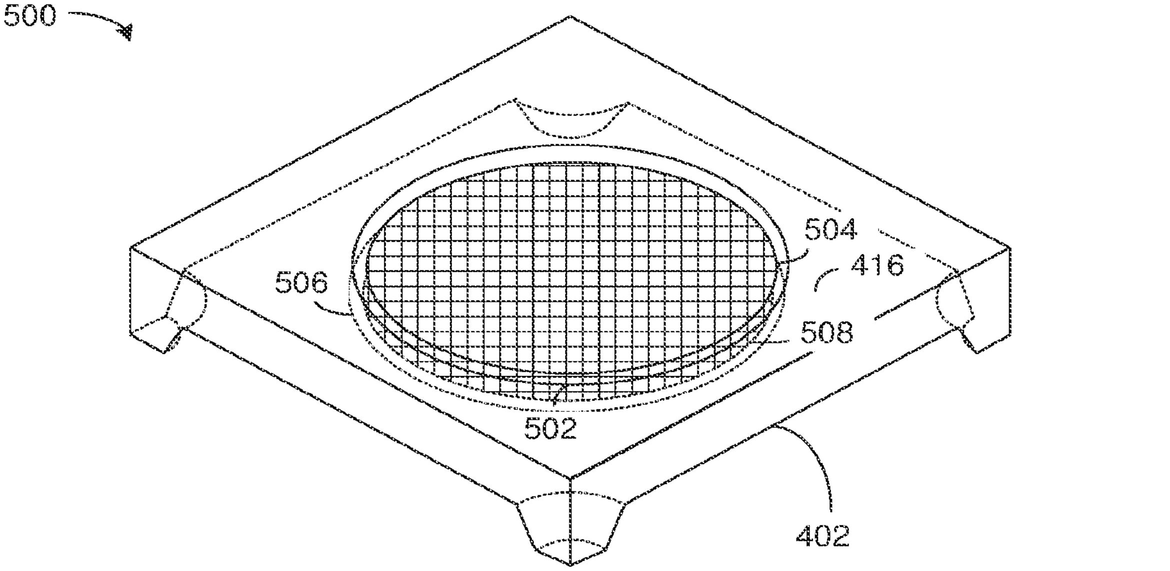
FIG. 12 illustrates a perspective view of an example of an antenna package with a second architecture.
Figure 13:
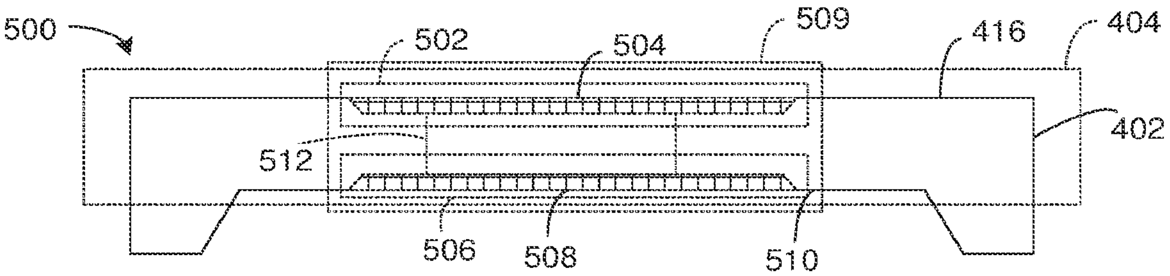
FIG. 13 illustrates a side view of the antenna package illustrated in FIG. 12.

FIG. 12 illustrates a perspective view of an example of an antenna package 500 and FIG. 13 illustrates a side view of the antenna package 500. Moreover, unless noted otherwise, reference to elements of the antenna package 500 can apply to either or both FIGS. 12 and 13.

The antenna package 500 is similar to the antenna package 400 illustrated in FIGS. 10-11. Moreover, the antenna package 500 can include a first cavity 502 shaped for a radiating element 504 and a second cavity 506 shaped for a parasitic element 508 of an antenna element. The first cavity 502 can be formed on the top surface 416 of the body portion 404 of the plastic antenna carrier 402. The second cavity 506 can be formed on a bottom surface 510 of the body portion 404 of the plastic antenna carrier 402. In some examples, as illustrated, a void or air gap 512 separates the first cavity 502 from the second cavity 506. In other examples, the void or air gap 512 can be omitted, such that a solid material (e.g., plastic) of the body portion 404 interposes between the first cavity 502 and the second cavity 506.

The void or air gap 512 can have a smaller diameter than the first cavity 502 and the second cavity 506. In examples where the void or air gap 512 is included, the radiating element 504 can be insert molded to form a plastic ring around the perimeter of the radiating element 504. In such a situation, the plastic ring can extend over the edges of the radiating element 504. Moreover, the parasitic element 508 can be made in a similar fashion as the radiating element 504. Upon forming the radiating element 504 and the parasitic element 508, the plastic antenna carrier 402 can be formed with the first cavity 502, the second cavity 506 and the void or air gap 512 between the first cavity 502 and the second cavity 506. The combination of the first cavity 502, the second cavity 506 and the void or air gap 512 can be referred to as a combined cavity 509. Accordingly, the middle of the combined cavity 509 corresponding to the void or air gap 512 can be narrower than the width of insert the molded radiating element 504 and the parasitic element 508. Additionally, the combined cavity 509 can be wider where the radiating element 504 and the parasitic element 508 will be positioned, namely the region of the first cavity 502 and the second cavity 506. Accordingly, upon forming the plastic antenna carrier 402 with the combined cavity 509, the radiating element 504 and the parasitic element 508 can be placed in the wider region of the combined cavity 509, namely the first cavity 502 and the second cavity 506, respectively (e.g., wider portions of the combined cavity 509). Thus, the plastic rings of the radiating element 504 and the parasitic element 508 can rest on and are supported by the material of the plastic antenna carrier 402.

The first cavity 502 can overlay the second cavity 506. The radiating element 504 can be positioned in the first cavity 502 and the parasitic element 508 can be positioned in the second cavity 506.

The radiating element 504 and the parasitic element 508 can be implemented as patch antennas. Additionally, although the radiating element 504 and the parasitic element 508 are illustrated as being round (e.g., circular), in other examples, the radiating element 504 and the parasitic element 508 can be polygonal (e.g., rectangular). Accordingly, the radiating element 504 can overly the parasitic element 508. Inclusion of the parasitic element 508 adds further directionality to electromagnetic waves communicated between the feed and free space.

Figure 14:
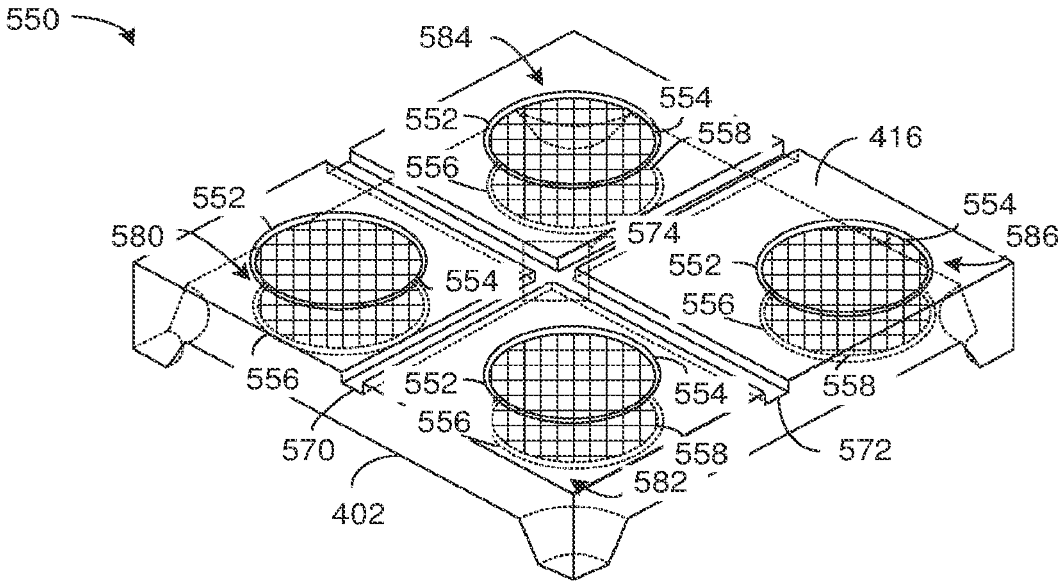
FIG. 14 illustrates a perspective view of an example of an antenna package with a third architecture.
Figure 15:
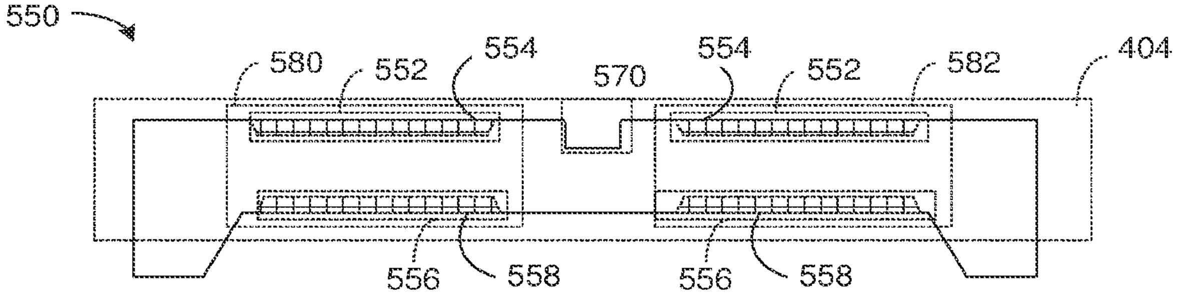
FIG. 15 illustrates a side view of the antenna package illustrated in FIG. 14.

FIG. 14 illustrates a perspective view of an example of an antenna package 550 and FIG. 15 illustrates a side view of the antenna package 550. Moreover, unless noted otherwise, reference to elements of the antenna package 550 can apply to either or both FIGS. 14 and 15.

The antenna package 550 is similar to the antenna package 400 illustrated in FIGS. 10-11 and the antenna package 500 illustrated in FIGS. 11-12. Moreover, the antenna package 550 can include a first set of cavities 552 for a set of radiating elements 554 of four different antenna elements 554. The antenna package 550 also can include a second set of cavities 556 for a set of parasitic elements 558 of the four different antenna elements 554.

Each cavity 552 in the first set of cavities 552 can be formed or integrated with the top surface 416 of the body portion 404. Additionally, each cavity 556 in the second set of cavities 556 can be formed on or integrated with the bottom surface 510 of the body portion 404. Additionally, each cavity 552 in the first set of cavities 552 can overly a respective cavity 556 in the second set of cavities 556. Accordingly, each radiating element 554 in the set of radiating elements 554 can overly a respective parasitic element 558 in the second set of parasitic elements 558.

Each radiating element 554 in the set of radiating elements 554 and each parasitic element 558 in the set of parasitic elements 558 can be implemented as patch antennas. Additionally, although each radiating element 554 in the set of radiating elements 554 and each parasitic element 558 in the set of parasitic elements 558 are illustrated as being round (e.g., circular), in other examples, the radiating element 504 and the parasitic element 508 can be polygonal (e.g., rectangular). Each radiating element 554 in the set of radiating elements 554 and each radiating element 554 in the set of parasitic elements 558 can be positioned within a lattice of phased array antenna. In the present example, there are four (4) radiating elements 554 in the set of radiating elements 554 and four (4) parasitic elements 558 in the set of parasitic elements 558. However in other examples, there could be more or less instances of the radiating elements 554 in the set of radiating elements 554 and the parasitic elements 558 in the set of parasitic elements 558.

Further, the top surface 416 of the body portion 404 can include a first recessed channel 570 and a second recessed channel 572 that extends across the body portion 404 of the plastic antenna carrier 402. The first recessed channel 570 and the second recessed channel 572 can each be implemented as a groove (e.g., such as a square groove) extending from one edge of the body portion 404 of the plastic antenna carrier 402 to the opposing edge. The first recessed channel 570 and the second recessed channel 572 can intersect near a middle 574 of the body portion 404. In this manner, each radiating element 554 in the first set of radiating elements 554 can be separated from each other by the first recessed channel 570 or the second recessed channel 572.

Each radiating element 554 can be grouped with the underlying parasitic element 558 within a particular antenna element. Thus, in the example illustrated, the antenna package 400 includes components for four (4) antenna elements, namely, a first antenna element 580, a second antenna element 582, a third antenna element 584 and a fourth antenna element 586. As explained herein, the antenna package 550 can be mounted on a dielectric substrate of a (single) antenna element module formed that includes the plastic antenna carrier 402 formed of continuous material (e.g., a polymer). In such a situation, the resultant antenna element module can house four (4) antenna elements that are separated by the first recessed channel 570 and the second recessed channel 572.

In operation, EM waves communicated with the radiating elements 554 of the set of radiating elements 554 can cause surface waves to propagate across the top surface 416 of the body portion 404. The first recessed channel 570 and the second recessed channel 572 provide a discontinuity in index of refraction of the plastic antenna carrier 402 that disrupts and/or impedes the flow of such surface waves.

Figure 16:
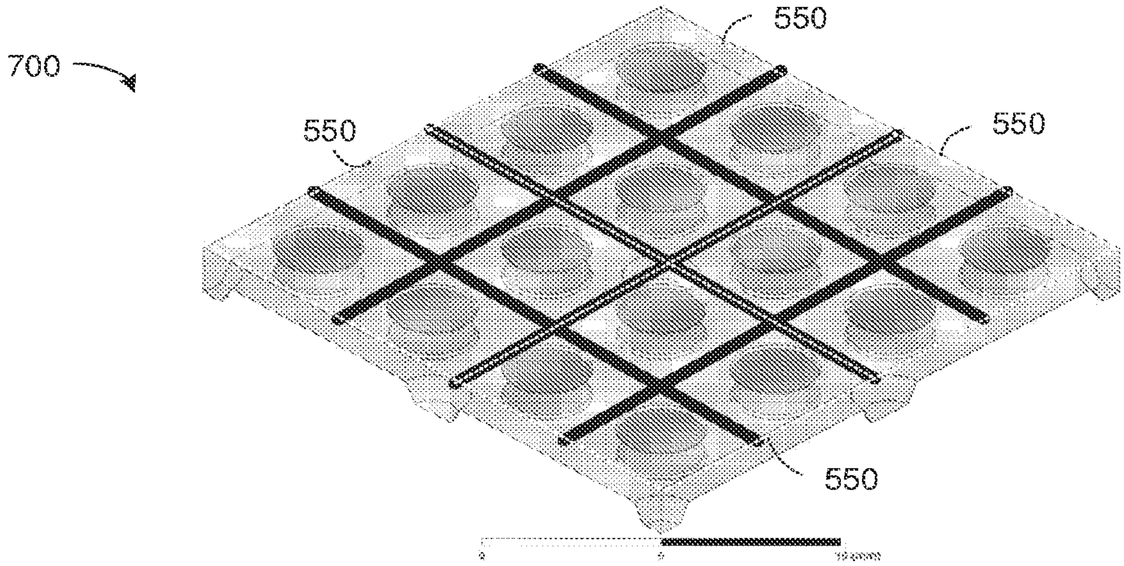
FIG. 16 illustrates a perspective view of an example of an antenna package with a fourth architecture.
Figure 17:
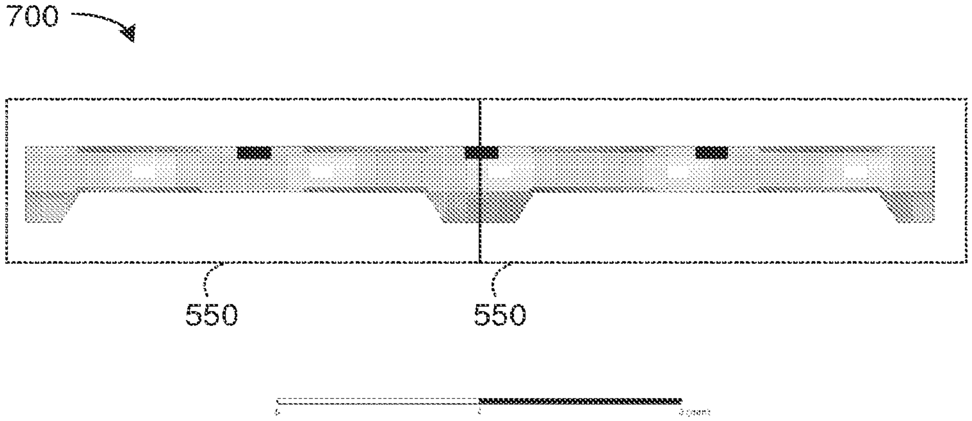
FIG. 17 illustrates a side view of the antenna package illustrated in FIG. 16.

FIG. 16 illustrates a perspective view of an example of an antenna package 700 and FIG. 17 illustrates a side view of the antenna package 700. Moreover, unless noted otherwise, reference to elements of the antenna package 700 can apply to either or both FIGS. 16 and 17.

The antenna package 700 represents four (4) instances of the antenna package 550 of FIGS. 14 and 15 that can be integrated in a single antenna package. Accordingly, the antenna package 700 can include sixteen (16) radiating elements 554 of the set of radiating element 554 and sixteen (16) parasitic elements 558 in the set of parasitic elements 558. Similar to the antenna package 550 of FIGS. 14-15, the antenna package 700 can be implemented on a (single) antenna element module that houses components for a sixteen (16) antenna elements.

Further there is no limit on the number of antenna elements employable for the antenna package 700. For instance, in some examples, there can be sufficient number (e.g., hundreds or thousands) of the set of radiating element 554 and the set of parasitic elements 558 for an entire phased array antenna.

Figure 18:
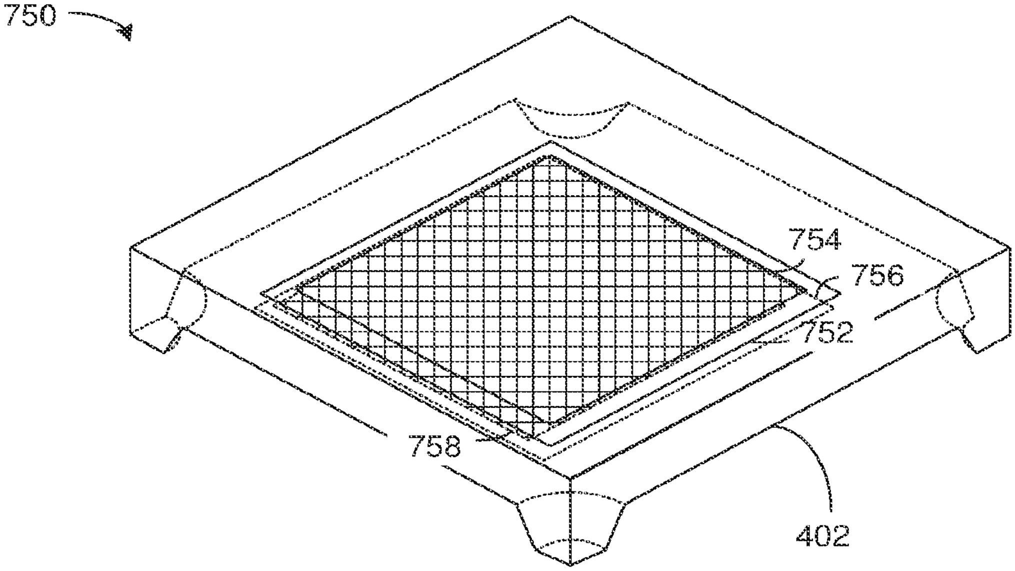
FIG. 18 illustrates a perspective view of an example of an antenna package with a fifth architecture.
Figure 19:
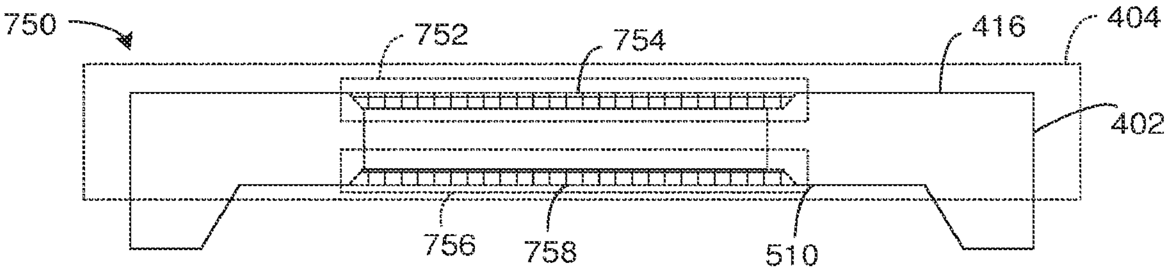
FIG. 19 illustrates a side view of the antenna package illustrated in FIG. 18.

FIG. 18 illustrates a perspective view of an example of an antenna package 750 and FIG. 19 illustrates a side view of the antenna package 750. The antenna package 750 is similar to the antenna package 500 of FIGS. 12 and 13. The antenna package 750 can include a first cavity 752 for a radiating element 754 of an antenna element positioned in the top surface 416 of the body portion 404 of the plastic antenna carrier 402. Moreover, the antenna package 750 can include a second cavity 756 for a parasitic element 758 of the antenna element in the bottom surface 510 of the body portion 404. The first antenna element 754 overlays the parasitic element 758.

The radiating element 754 and the parasitic element 758 can be implemented as patch antennas. The radiating element 754 and the parasitic element 758 can each have a polygonal (e.g., rectangular) shape.

Figure 20:
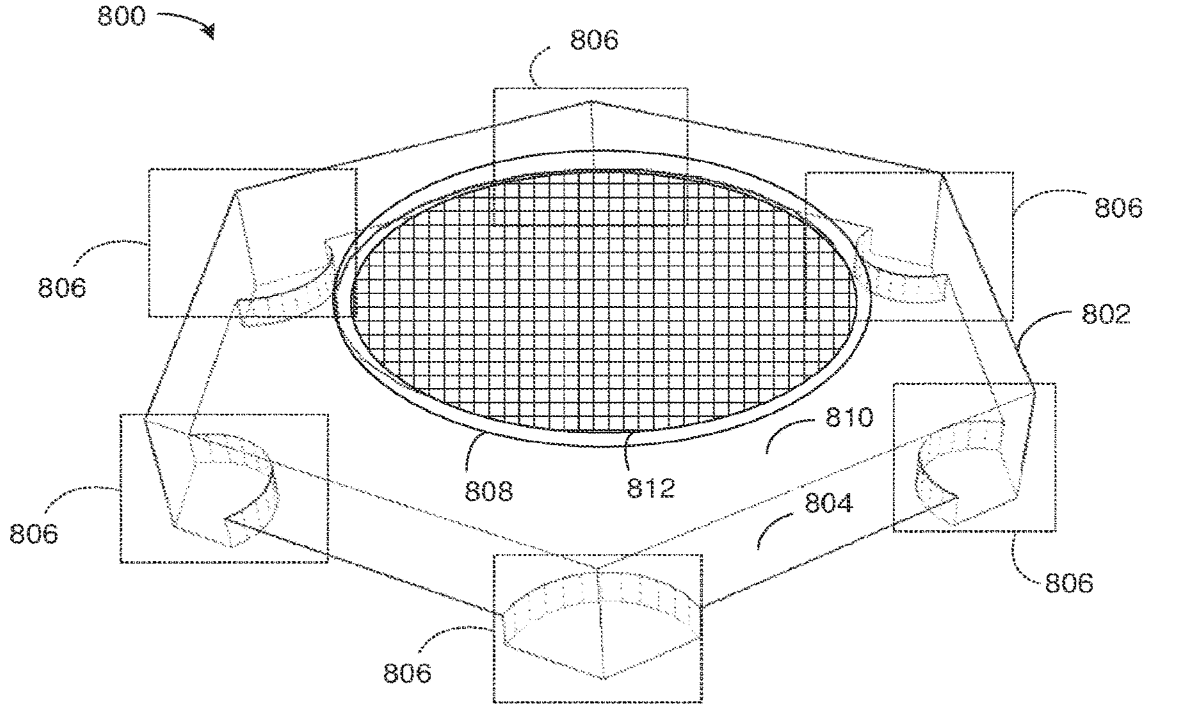
FIG. 20 illustrates a perspective view of an example of an antenna package with a sixth architecture.
Figure 21:
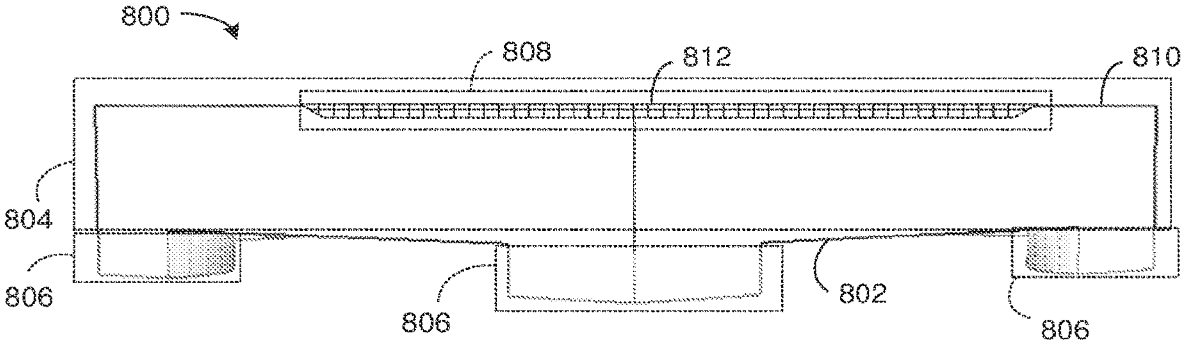
FIG. 21 illustrates a side view of the antenna package illustrated in FIG. 20.

FIG. 20 illustrates a perspective view of an example of an antenna package 800 and FIG. 21 illustrates a side view of the antenna package 800. FIGS. 20 and 21 employ the same reference numbers to denote the same structure. Moreover, unless noted otherwise, reference to elements of the antenna package 800 applies to both FIGS. 10 and 11. The antenna package 800 can be employed to implement the antenna package 22 of FIG. 1, the antenna package 70 of FIG. 2 and/or the antenna package 130 of FIG. 3.

The antenna package 800 can include a plastic antenna carrier 802 with a body portion 804 and legs 806. The antenna package 800 is similar to the antenna package 400 of FIG. 10. The body portion 804 can have a hexagonal base shape, rather than the rectangular base shape of the body portion 404 of FIGS. 10-19. Each leg 806 can be positioned at a vertex of the body portion 804. Additionally, in some examples, each leg 806 can have a length of about 0.25 mm to about 2 mm. Moreover, the antenna package 800 can include a cavity 808 formed or integrated with a top surface 810 of the body portion 804 of the plastic antenna carrier 802. A radiating element 812 can be positioned in the cavity 808.

The antenna package 800 can be adapted to include multiple sets of cavities and multiple sets of radiating elements, as is illustrated and described with respect to FIGS. 12-17. Additionally, although the radiating element 812 is illustrated as being round, in other examples, the radiating element 812 can have a polygonal shape, such as the radiating element 754 illustrated in FIGS. 18 and 19.

Figure 22:
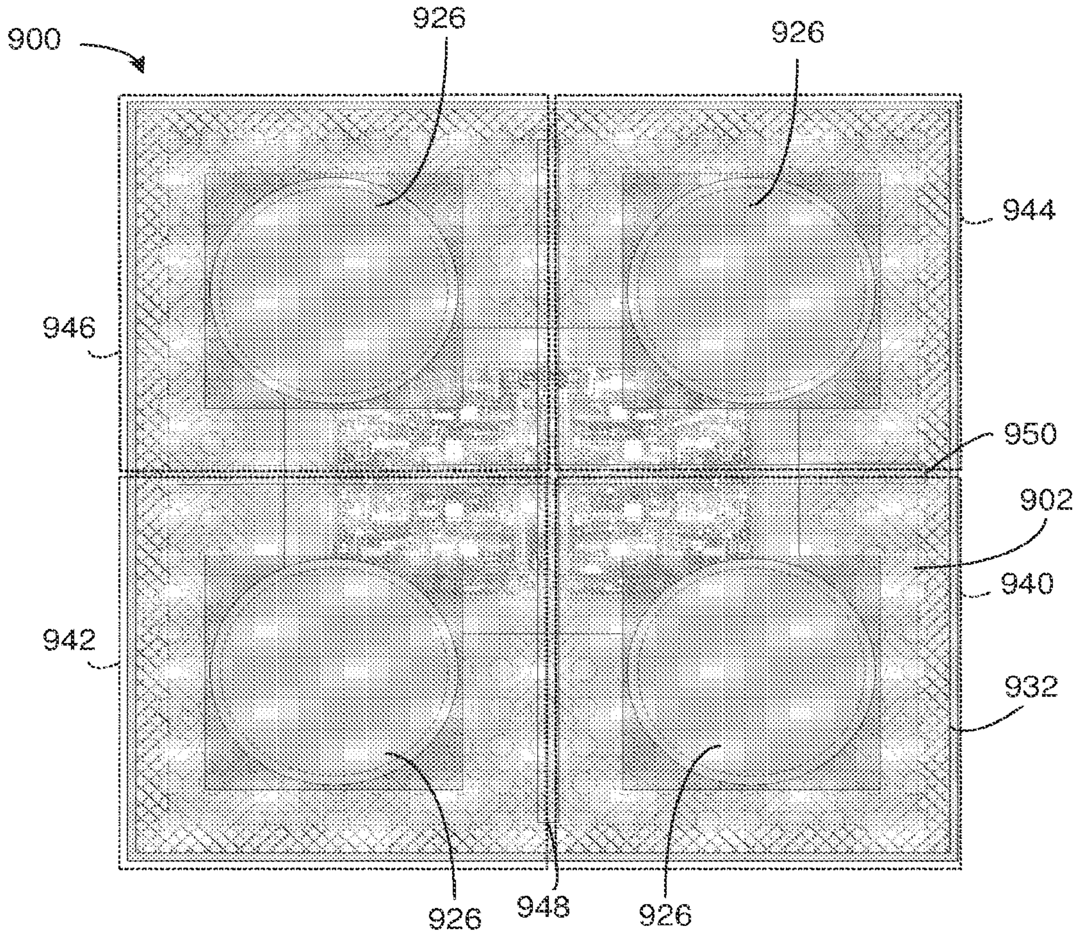
FIG. 22 illustrates a top view of an antenna element module.
Figure 23:
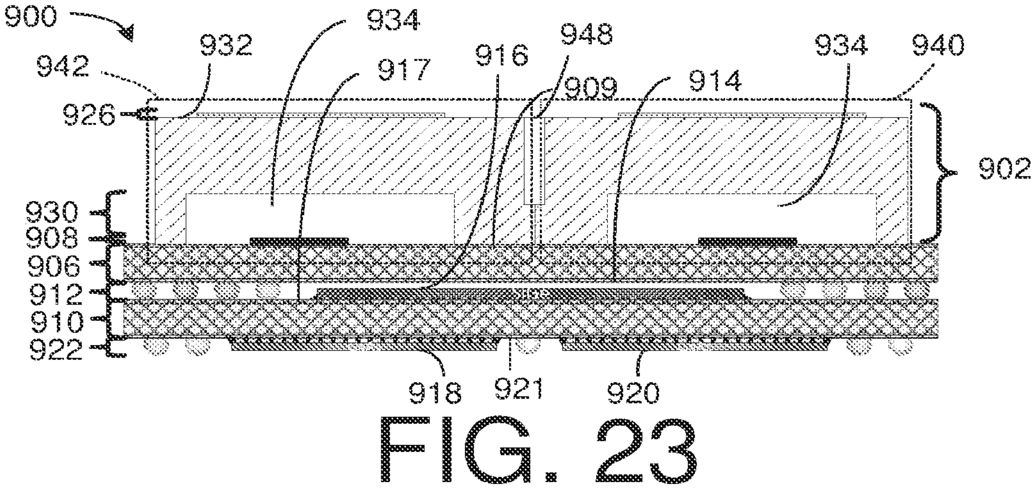
FIG. 23 illustrates a side view of the antenna element module of FIG. 22.

FIG. 22 illustrates a top view of an antenna element module 900 that can be employed to implement the antenna element module 8 and/or the antenna element module 52 of FIG. 2. FIG. 23 illustrates a side view of the antenna element module 900. FIGS. 22 and 23 employ the same reference numbers to denote the same structure. The antenna element module 900 can be mounted on multi-layer substrate, such as the multi-layer substrate 10 of FIG. 1 and/or the multi-layer substrate 54 of FIGS. 2 and 3. The antenna element module 900 can include an antenna package 902. The antenna package 902 can be implemented, for example, by the antenna package 550 of FIGS. 14 and 15.

The antenna element module 900 can include a first dielectric substrate 906 with a feed 908 disposed on or integrated with a top surface 909 of the first dielectric substrate 906. Each feed 908 can be implemented, for example, as a slot, or as a pair of orthogonally arranged slots. In the example illustrated, there are four (4) instances of such feeds (e.g., four (4) pairs of orthogonally arranged slots).

The first dielectric substrate 906 can be mounted to a second dielectric substrate 910 (e.g., a circuit board) via a first layer of solder balls 912 that can be arranged as a BGA on a bottom surface 914 of the first dielectric substrate 906. A first IC chip 916 can be adhered (mounted) to a top surface 917 of the second dielectric substrate 910. A second IC chip 918 and a third IC chip 920 can be adhered (mounted) on a bottom surface 921 of the second dielectric substrate 910. The bottom surface 921 of the second dielectric substrate 910 can include solder balls 922 arranged in a BGA for mounting the antenna element module 900 on the multilayer substrate. In some examples, the second IC chip 918 and the third IC chip 920 can communicate with respective feeds through vias in the first dielectric substrate 906, the solder balls 912 and vias in the second dielectric substrate 910. Similarly, the second IC chip 918 and the third IC chip 920 can communicate with the first IC chip 916 through the vias in the second dielectric substrate 910. Additionally, the multi-layer substrate can be coupled to power circuits and/or controllers that can provide signals to the first IC chip 916, the second IC chip 918. In this manner, the vias in the second dielectric substrate and the solder balls 922 can allow communication between the first IC chip 916 and the multi-layer substrate.

In one example of operation, the second IC chip 918 and the third IC chip 920 interposes signals communicated between a corresponding feed 908 and the first IC chip 916. Moreover, the first IC chip 916, the second IC chip 918 and the third IC chip 920 can adjust (e.g., amplify, filter and/or phase shift) signals communicated between the feeds 908 and the multi-layer substrate.

Furthermore, the antenna package 902 can be adhered to the top surface 909 of the first dielectric substrate 906. As described herein, legs 930 on a plastic antenna carrier 932 of the antenna package 902 maintain gaps 934 (e.g., air gaps or voids) between the feeds 908 and the radiating elements 926. Moreover, signals communicated with the feeds 908 can be coupled by the radiating elements 926. For example, in a receiving mode, EM signals from an external source can be received by the radiating elements 926 that is couple to the respective feed 908 and converted into electrical signals by the feeds 908 for communication with the first IC chip 916, the second IC chip 918 and/or the third IC chip 920. Conversely, in a transmitting mode, signals communicated from the second IC chip 918 and/or the third IC chip 920 to the feeds 908. The feeds 908 convert such signals into EM signals that can be propagated into free space by the radiating elements 926.

As illustrated, the antenna element module 900 includes four (4) antenna elements, namely a first antenna element 940, a second antenna element 942, a third antenna element 944 and a fourth antenna element 946. Each antenna element includes a radiating element 925 that overlays a feed 908. Moreover, as noted, in some examples, a parasitic element can interpose between the radiating element 926 and the feed 908. The plastic antenna carrier 932 can be formed of continuous plastic material. Each of the first antenna element 940, the second antenna element 942, the third antenna element 944 and the fourth antenna element 946 can be separated by a first recess channel 948 and a second recess channel 950 that prevent unwanted surface wave propagation between antenna elements.

Figure 24:
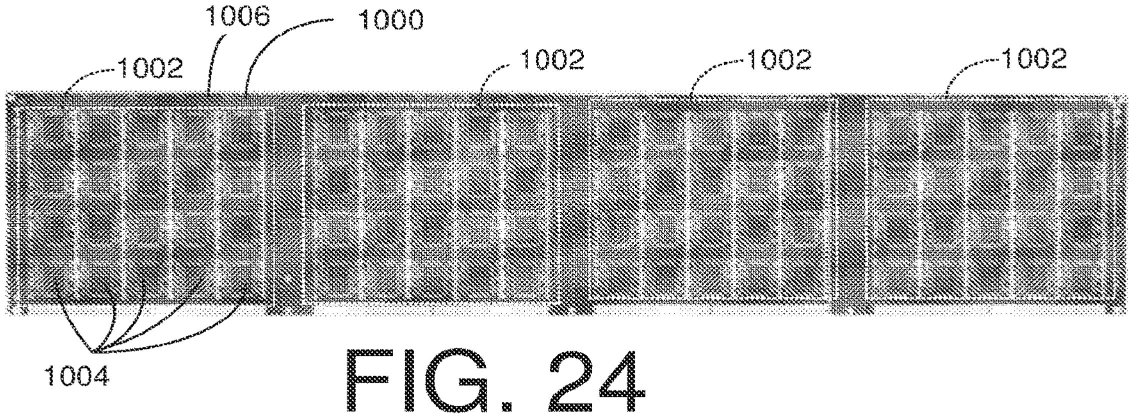
FIG. 24 illustrates an example of a plurality of arrays of IC chips mounted on a dielectric substrate.
Figure 25:
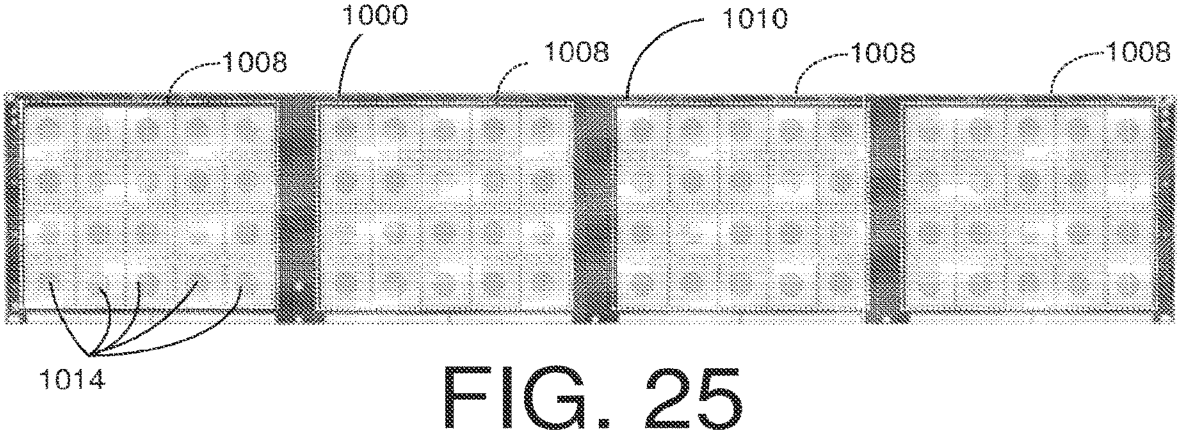
FIG. 25 illustrates an example of a plurality arrays of antenna packages mounted on the dielectric substrate of FIG. 24.

FIGS. 24 and 25 demonstrates a packaging process for fabricating antenna element modules, such as the antenna element modules 8 of FIG. 1, the antenna element modules 52 of FIGS. 2-3, the antenna element modules 102 of FIG. 3, the antenna element module 152 of FIG. 4 and/or the antenna element module 900 of FIGS. 21 and 22. FIGS. 24 and 25 employ the same reference numbers to denote the same structure. Additionally, unless noted otherwise, reference to elements apply to either or both FIGS. 24 and 25.

FIG. 24 illustrates a dielectric substrate 1000 wherein four (4) arrays of IC chips 1002 can be mounted on the dielectric substrate 1000. In other examples, there could be more or less arrays of IC chip 1004. Each array of IC chips 1002 can include sixteen IC chips 1004 (e.g., 4 rows and 4 columns of IC chips 1004) mounted on the dielectric substrate 1000, wherein only some of the IC chips 1004 are labeled. The IC chips 1004 can be mounted on a bottom surface 1006 of the dielectric substrate 1000 in a flip chip packaging process. Stated differently, each of the IC chip 1004 can be mounted on the exposed surface the dielectric substrate 1000 (e.g., the bottom surface 1006) and the dielectric substrate 1000 can be flipped.

Upon flipping the dielectric substrate 1000 such that a top surface 1010 is exposed, four (4) arrays of antenna packages 1008 can be adhered to the top surface 1010 of the dielectric substrate 1000, as illustrated in FIG. 25. In the example illustrated, each array of antenna packages 1008 can include sixteen (16) antenna packages 1014 (e.g., 4 rows and 4 columns of antenna packages 1014), wherein only some of the antenna packages 1014 are labeled. However, in other examples, there could be more or less antenna packages 1014. Each antenna package 1014 can overlay a corresponding IC chip 1004. Upon adhering the arrays of antenna packages 1008 to the dielectric substrate 1000, the dielectric substrate 1000 can be cut with a laser or saw in a singulation process to provide the antenna element modules. More specifically, the dielectric substrate 1000 can be cut with a laser or saw to provide a set antenna element modules with any number of IC chips 1004 and antenna packages 1008. The resultant antenna element modules can be mounted on a multi-layer substrate (e.g., the multi-layer substrate 10 of FIG. 1, the multi-layer substrate 54 of FIG. 2, the multi-layer substrate 104 of FIG. 4 and/or the multi-layer substrate 154 of FIG. 5) in a manner described herein.

Figure 26:
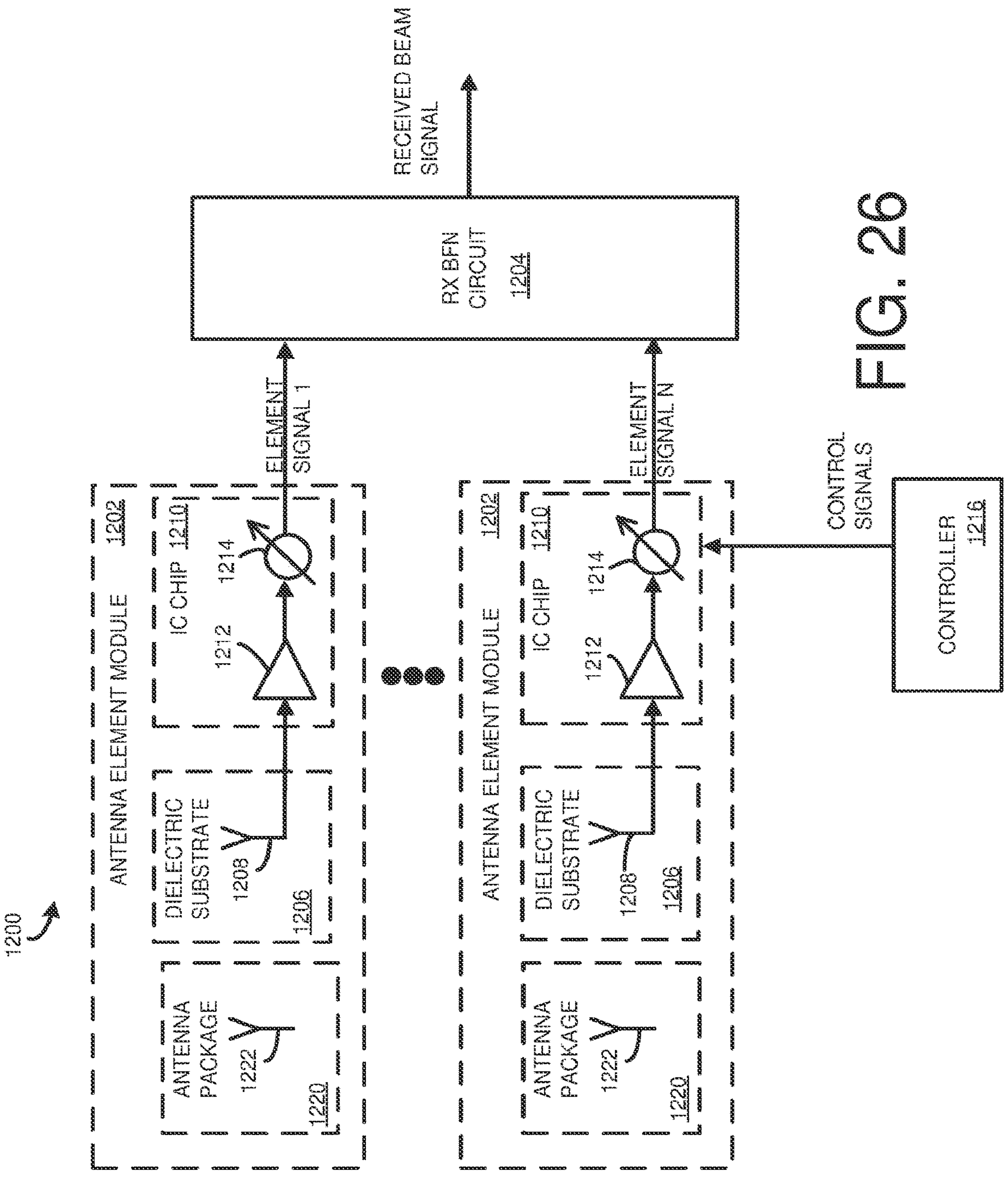
FIG. 26 illustrates a block diagram of an example phased array antenna operating in receiving mode.

FIG. 26 illustrates a block diagram of an example phased array antenna 1200 that depicts the logical interconnection of the phased array antenna 2 of FIG. 1 and/or the phased array antenna 50 of FIGS. 2 and 3 operating in receiving mode. Moreover, the architecture of the phased array antenna 100 of FIG. 4 or the architecture of the phased array antenna 150 of FIG. 5 could be employed to implement the phased array antenna 1200 of FIG. 26. In the illustrated example, N number of antenna element modules 1202 communicate with a receiving (RX) BFN circuit 1204.

Each of the N number of antenna element modules 1202 can include a dielectric substrate 1206 with a feed 1208 (e.g., a slot or a pair of orthogonally arranged slots) disposed on or integrated with the dielectric substrate 1206. Each of the N number of antenna element modules 1202 also can include an IC chip 1210 mounted on the dielectric substrate 1206. In the illustrated example, each IC chip 1210 can include an amplifier 1212 and a phase shifter 1214. The IC chips 1210 can receive control signals from a controller 1216 that can be implemented on an external system (e.g., a local system). In some examples, the control signals can control a gain of each amplifier 1212 and/or a phase shift applied by each phase shifter 1214. Thus, in some examples, each amplifier 1212 can be implemented as a variable gain amplifier, a switched attenuator circuit, etc.

Each of the N number of antenna element modules 1202 can further include an antenna package 1220 adhered to the dielectric substrate 1206. The antenna package 1220 can include a radiating element 1222 that is spaced away from the feed 1208 via an air gap.

In operation, an EM signal received by each of the N number of radiating elements 1222 (or some subset thereof) can be coupled toward the corresponding feed 1208 of the dielectric substrate 1206. Each of the N number of feeds 1208 can convert the EM signal into an electrical signal that can be provided to a corresponding IC chip 1210 for adjustment. Each amplifier 1212 of the IC chips 1210 can amplify the provided electrical signal and each phase shifter 1214 can apply a phase shift to output N number of element signals, which can alternatively be referred to as adjusted signals. In some examples of the phased array antenna 1200 of FIG. 26, the phase shifters 1214 can apply a variable amount of phase adjustment in response to the control signals provided from the controller 1216. Additionally or alternatively, the amplifiers 1212 can provide a variable amount of amplitude adjustment in response to the control signals provided from the controller 1216. The N number of element signals can be provided to the RX BFN circuit 1204. The RX BFN circuit 1204 can combine the N number of element signals to form a received beam signal that can be provided to the local system for demodulating and processing.

Figure 27:
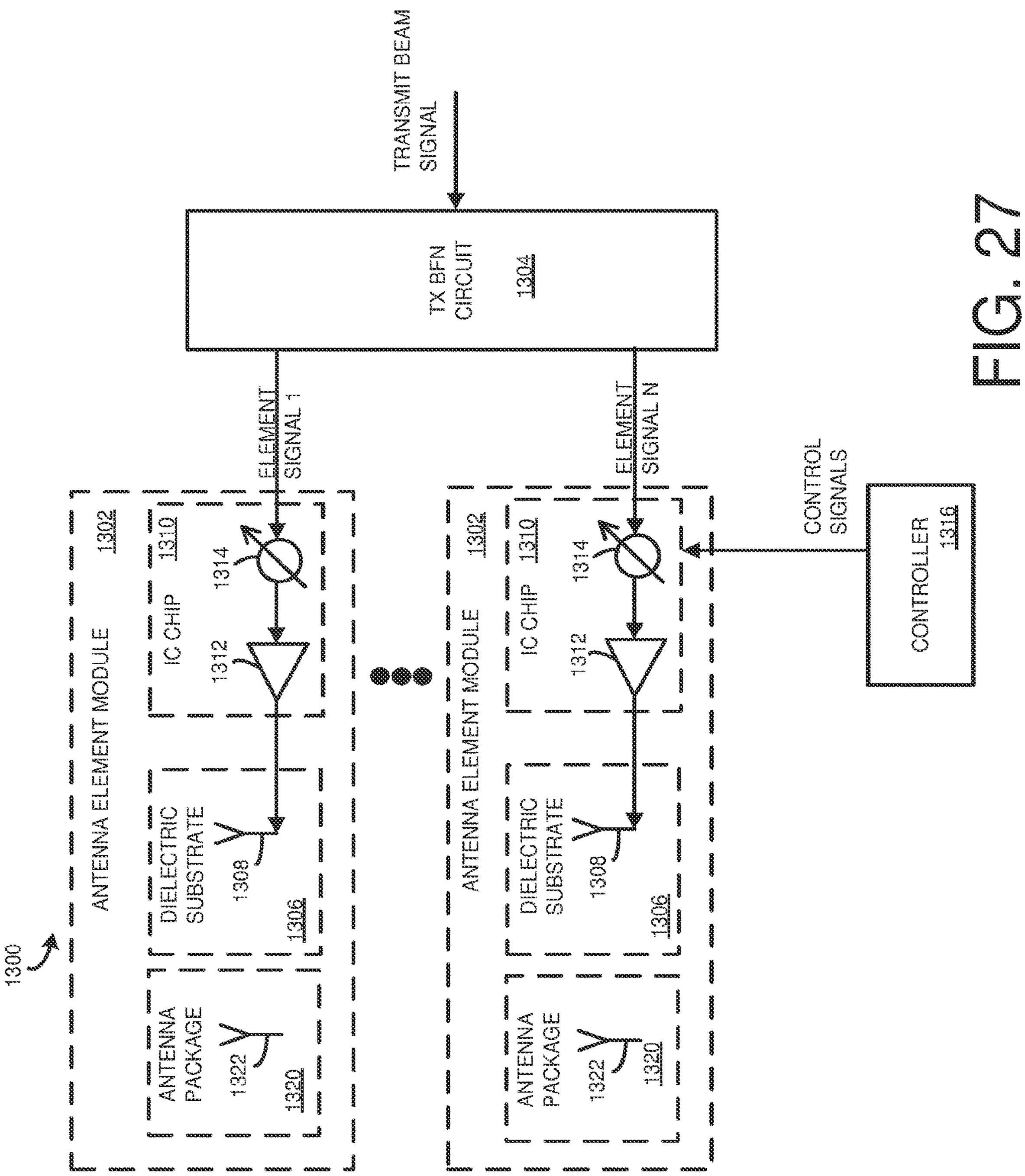
FIG. 27 illustrates a block diagram of an example phased array antenna operating in transmitting mode.

FIG. 27 illustrates a block diagram of a phased array antenna 1300 that depicts the logical interconnection of the phased array antenna 2 of FIG. 1 and/or the phased array antenna 50 of FIGS. 2 and 3 operating in transmitting mode. Moreover, the architecture of the phased array antenna 100 of FIG. 4 or the architecture of the phased array antenna 150 of FIG. 5 could be employed to implement the phased array antenna 1300 of FIG. 27. In the illustrated example, N number of antenna element modules 1302 communicate with a transmitting (TX) BFN circuit 1304.

Each of the N number of antenna element modules 1302 can include a dielectric substrate 1306 with a feed 1308 (e.g., a slot or a pair of orthogonally arranged slots) disposed on or integrated with the dielectric substrate 1306. Each of the N number of antenna element modules 1302 also can include an IC chip 1310. In the illustrated example, each IC chip 1310 can include an amplifier 1312 and a phase shifter 1314. The IC chips 1310 can receive control signals from a controller 1316 that can be implemented on an external system (e.g., a local system). In some examples, the control signals can control a variable amount of amplitude adjustment applied by each amplifier 1312 and/or a variable amount of phase adjustment applied by each phase shifter 1314. Thus, in some examples, each amplifier 1312 can be implemented as a variable gain amplifier, a switched attenuator circuit, etc.

Each of the N number of antenna element modules 1302 can further include an antenna package 1320 adhered to the dielectric substrate 1306. The antenna package 1320 can include a radiating element 1322 that is spaced away from the feed 1308 via an air gap. The radiating element 1322 can be implemented as a patch antenna or multiple patch antennas.

In operation, a transmit beam signal can be provided from the local system to the TX BFN circuit 1304. The TX BFN circuit 1304 divides the transmit beam signal into N number of element signals that can be provided to the N number of antenna element modules 1302. Each IC chip 1310 of the N number of antenna element modules 1302 can adjust a corresponding element signal to generate an adjusted signal that can be provided to a corresponding feed 1308. Each of the N number of feeds 1308 can convert the corresponding adjusted signal into an EM signal that is propagated toward a corresponding radiating element 1322 of the antenna package 1320. In the example illustrated, the adjusting can include the phase shifter 1314 phase shifting the element signal and the amplifier 1312 amplifying the element signal. Each radiating element 1322 can couple the corresponding adjusted as an EM signal into free space.

Figure 28:
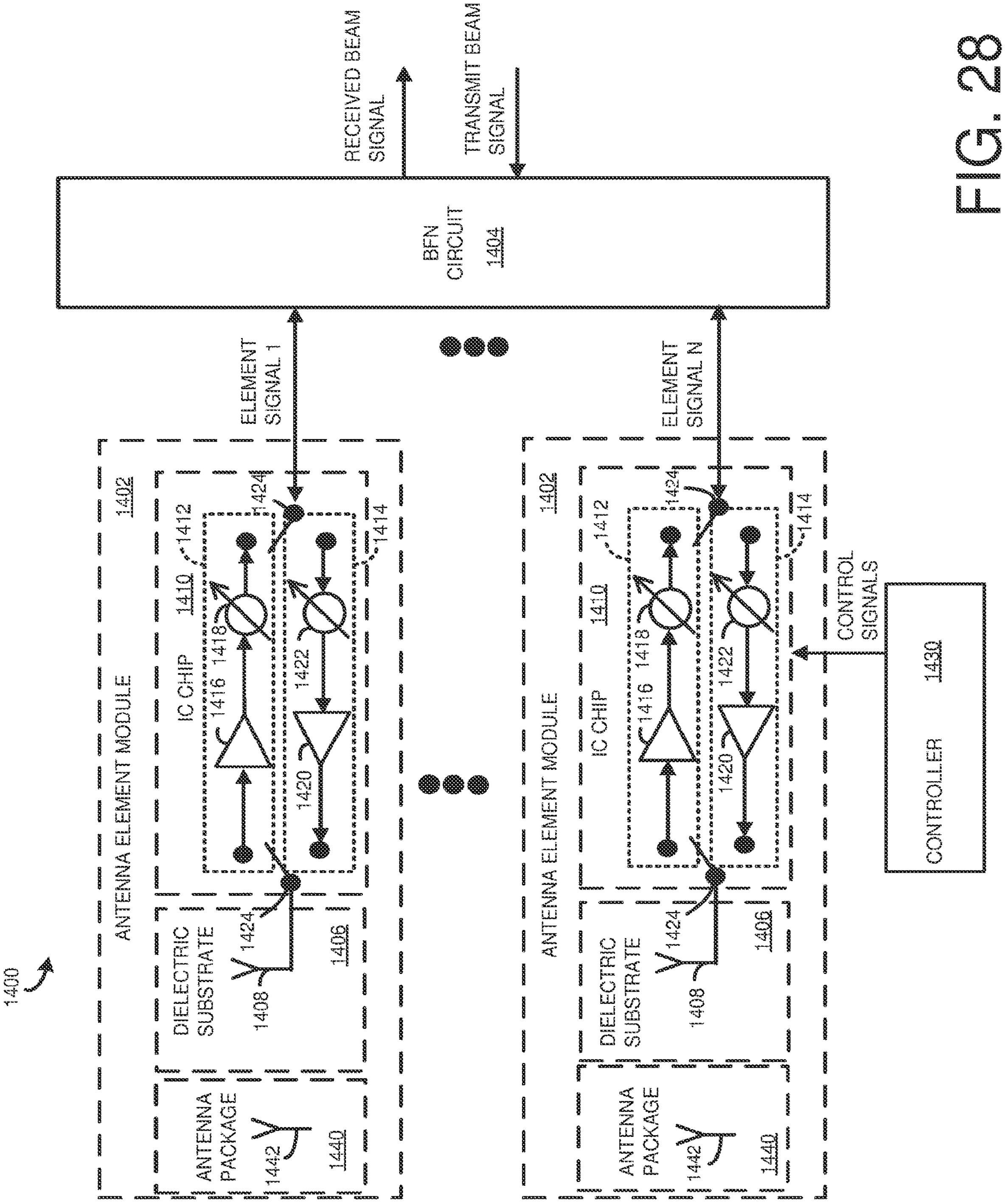
FIG. 28 illustrates a block diagram of an example phased array antenna operating in half-duplex mode.

FIG. 28 illustrates a block diagram of a phased array antenna 1400 that depicts the logical interconnection of the phased array antenna 2 of FIG. 1 and/or the phased array antenna 50 of FIGS. 2 and 3 operating in half-duplex mode. Moreover, the architecture of the phased array antenna 100 of FIG. 4 or the architecture of the phased array antenna 150 of FIG. 5 could be employed to implement the phased array antenna 1400 of FIG. 28. In half-duplex mode, the phased array antenna 1400 switches between a receiving mode and a transmitting mode. In the illustrated example, N number of antenna element modules 1402 communicate with a BFN circuit 1404.

Each of the N number of antenna element modules 1402 can include a dielectric substrate 1406 with a feed 1408 (e.g., a slot or a pair of orthogonally arranged slots) that can be disposed or integrated with the dielectric substrate. Each of the N number of antenna element modules 1402 also can include an IC chip 1410. In the illustrated example, each IC chip 1410 can include a receiving path 1412 and a transmitting path 1414. The receiving path 1412 can include a receiving amplifier 1416 and a receiving phase shifter 1418 for adjusting signals received from a corresponding feed 1408. Similarly, the transmitting path 1414 can include a transmitting amplifier 1420 and a transmitting phase shifter 1422 for adjusting a corresponding element signal provided from the BFN circuit 1404.

Each IC chip 1410 also can include switches 1424 (e.g., transistor switches) for switching between the receiving mode and the transmitting mode. The IC chips 1410 can receive control signals from a controller 1430 that can be implemented on an external system (e.g., a local system). The control signals can control a state of the switches 1424 to switch the phased array antenna 1400 from the receiving mode to the transmitting mode, or vice-versa. Additionally, in some examples, the control signals provided from the controller 1430 can control a variable amount of amplitude adjustment applied by each receiving amplifier 1416 and each transmitting amplifier 1420. Thus, in some examples, each receiving amplifier 1416 and each transmitting amplifier 1420 can be implemented as a variable gain amplifier, a switched attenuator circuit, etc. Similarly, in some examples, the control signals provided from the controller 1430 can control a variable amount of phase adjustment applied by each receiving phase shifter 1418 and each transmitting phase shifter 1422.

Each of the N number of antenna element modules 1402 can further include an antenna package 1440 adhered to the dielectric substrate 1406. The antenna package 1440 can include a radiating element 1442 that is spaced away from the feed 1408 via an air gap. The radiating element 1442 can be implemented as a patch antenna or multiple patch antennas.

In operation in the receiving mode, the controller 1430 sets the switches 1424 of the IC chips 1410 to route signals through the receiving path 1412. Moreover, in the receiving mode an EM signal received by each of the N number of radiating elements 1442 (or some subset thereof) can be coupled toward a corresponding feed 1408 provided to a corresponding IC chip 1410 for adjustment. Each receiving amplifier 1416 of the IC chips 1410 amplifies the provided signal and each receiving phase shifter 1418 applies a phase shift to output N number of element signals, which can alternatively be referred to as adjusted signals. The N number of element signals can be provided to the BEN circuit 1404. The BFN circuit 1404 can combine the N number of element signals to form a received beam signal that can be provided to the local system for demodulating and processing.

In operation in the transmitting mode, the controller 1430 sets the switches 1424 to the transmitting path 1414 to transmit a beam signal that can be provided from the local system to the BFN circuit 1404. The BEN circuit 1404 divides the transmit beam signal into N number of element signals that can be provided to the N number of antenna element modules 1402. Each IC chip 1410 of the N number of antenna element modules 1402 can adjust a corresponding element signal to generate an adjusted signal that can be provided to a corresponding feed 1408. In the example illustrated, the adjusting can include the transmitting phase shifter 1422 phase shifting the element signal and the transmitting amplifier 1420 amplifying the element signal. Each feed 1408 propagates the corresponding adjusted signal as an EM signal toward the corresponding radiating element 1442. Moreover, the radiating elements 1442 can couple the EM signal into frees space.

In the half-duplex mode, the phased array antenna 1400 switches between the receiving mode and the transmitting mode. In this manner, the same antenna element modules 1402 can be employed for both the transmission and the reception of RF signals.

Figure 29:
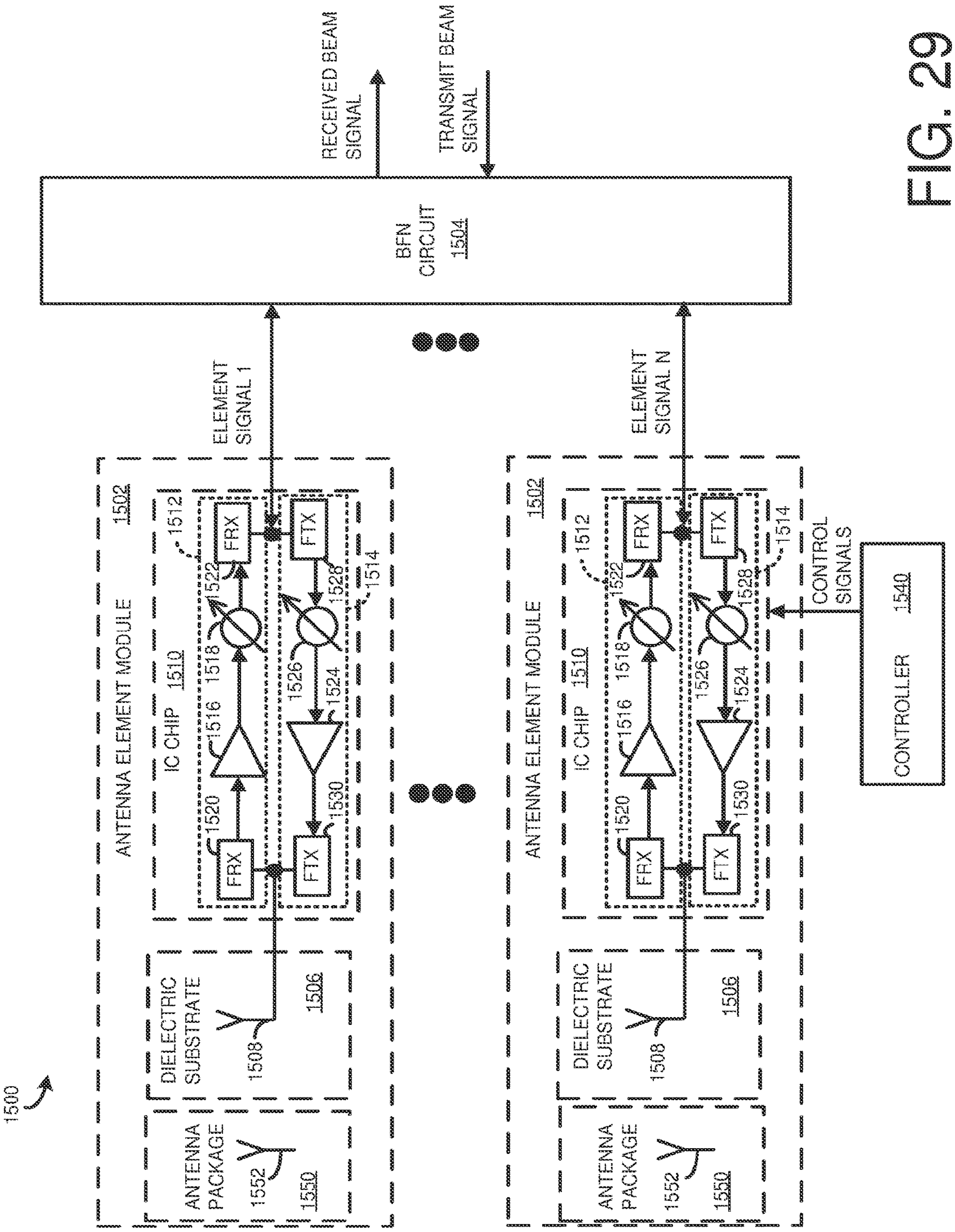
FIG. 29 illustrates a block diagram of an example phased array antenna operating in frequency division duplex mode.

FIG. 29 illustrates a block diagram of a phased array antenna 1500 that depicts the logical interconnection of the phased array antenna 2 of FIG. 1 and/or the phased array antenna 50 of FIGS. 2 and 3 operating in frequency division duplex mode. Moreover, the architecture of the phased array antenna 100 of FIG. 4 or the architecture of the phased array antenna 150 of FIG. 5 could be employed to implement the phased array antenna 1500 of FIG. 29. In frequency division duplex mode, the phased array antenna 1500 can include circuitry for processing RF signals received within a receiving band and for propagating RF signals in a transmitting band.

In the illustrated example, N number of antenna element modules 1502 communicate with a BFN circuit 1504. Each of the N number of antenna element modules 1502 can include a dielectric substrate 1506 with a feed 1508 (e.g., a slot or a pair of orthogonally arranged slots) disposed on or integrated with the dielectric substrate 1506. Each of the N number of antenna element modules 1502 also can include an IC chip 1510. In the illustrated example, each IC chip 1510 can include a receiving path 1512 and a transmitting path 1514. The receiving path 1512 can include a receiving amplifier 1516 and a receiving phase shifter 1518 for adjusting signals received from a corresponding feed 1508. Additionally, the receiving path 1512 can include an input receiving filter 1520 and an output receiving filter 1522. The input receiving filter 1520 and the output receiving filter 1522 can be implemented as relatively narrow band pass filters that remove signals with frequencies outside the receiving band. Accordingly, the input receiving filter 1520 and the output receiving filter 1522 can have a passband set to the reconceiving band.

Similarly, the transmitting path 1514 can include a transmitting amplifier 1524 and a transmitting phase shifter 1526 for adjusting a corresponding element signal provided from the BFN circuit 1504. Additionally, the transmitting path 1514 can include an input transmitting filter 1528 and an output receiving filter 1522. The input transmitting filter 1528 and the output transmitting filter 1530 can be implemented as relatively narrow band pass filters that remove signals with frequencies outside the transmitting band. Accordingly, the input transmitting filter 1528 and the output transmitting filter 1530 can have a passband set to the transmitting band.

The IC chips 1510 can receive control signals from a controller 1540 that can be implemented on an external system (e.g., a local system). In some examples, the control signals control the passband and/or a bandwidth of the input receiving filter 1520 and the output receiving filter 1522. Similarly, in some examples, the control signals provided from the controller 1540 control the passband and/or bandwidth of the input transmitting filter 1528 and the output transmitting filter 1530. Additionally or alternatively, the control signals provided from the controller 1540 can control a variable amount of amplitude adjustment applied by each receiving amplifier 1516 and each transmitting amplifier 1524. Thus, in some examples, each receiving amplifier 1516 and each transmitting amplifier 1524 can be implemented as a variable gain amplifier, a switched attenuator circuit, etc. Similarly, in some examples, the control signals provided from the controller 1540 can control a variable amount of phase adjustment applied by each receiving phase shifter 1518 and each transmitting phase shifter 1526.

Each of the N number of antenna element modules 1502 can further include an antenna package 1550 adhered to the dielectric substrate 1506. The antenna package 1550 can include a radiating element 1552 that is spaced away from the feed 1508 via an a void or air gap. The radiating element 1552 can be implemented as a patch antenna or multiple patch antennas.

In operation, the phased array antenna 1500 can concurrently operate in a receiving mode and a transmitting mode based on a frequency of a signal traversing the phased array antenna 1500. More specifically, EM signals can be received by each of the N number of radiating elements 1552 (or some subset thereof), and these signals can be coupled toward corresponding feeds 1508. Each such feed 1508 can convert the EM signal into an electrical signal that is provided to a corresponding IC chip 1510 for adjustment. A signal within the passband (the receiving band) of the input receiving filter 1520 can be adjusted (e.g., amplified and phase shifted) by the receiving path of a corresponding IC chip 1510. The adjusted signal can be filtered by the output receiving filter 1522 and provided as an element signal to the BFN circuit 1504. In this manner, the BFN circuit 1504 receives N number of element signals from the N number of antenna element modules 1502, wherein each of the received N number of element signals can be within the receiving band.

Additionally, concurrently with the receiving of the RF signals, a transmit beam signal can be provided from the local system to the BFN circuit 1504. The BFN circuit 1504 divides the transmit beam signal into N number of element signals that can be provided to the N number of antenna element modules 1502. The input transmitting filter 1528 of each IC chip 1510 of the N number of antenna element modules 1502 removes signals outside of the passband (the transmitting band). Additionally, the transmitting path 1514 can adjust (phase shift and amplify) a corresponding element signal to generate an adjusted signal that can be provided through the output transmitting filter 1530 and to a corresponding feed 1508. Each feed 1508 can convert the corresponding adjusted signal into an EM signal that is propagated toward the corresponding radiating element 1552. Additionally, each corresponding radiating element 1552 can couple the EM signal into free space.

In the phased array antenna 1500, the frequency of traversing signals controls the routing of signals through the phased array antenna 1500. In this manner, the same antenna element modules 1502 can be employed for both the transmission and the reception of RF signals. Additionally, in some examples, the phased array antenna 1500 can have an architecture that intermittently switches between the transmitting mode and the receiving mode to provide half-duplexing.

Figure 30:
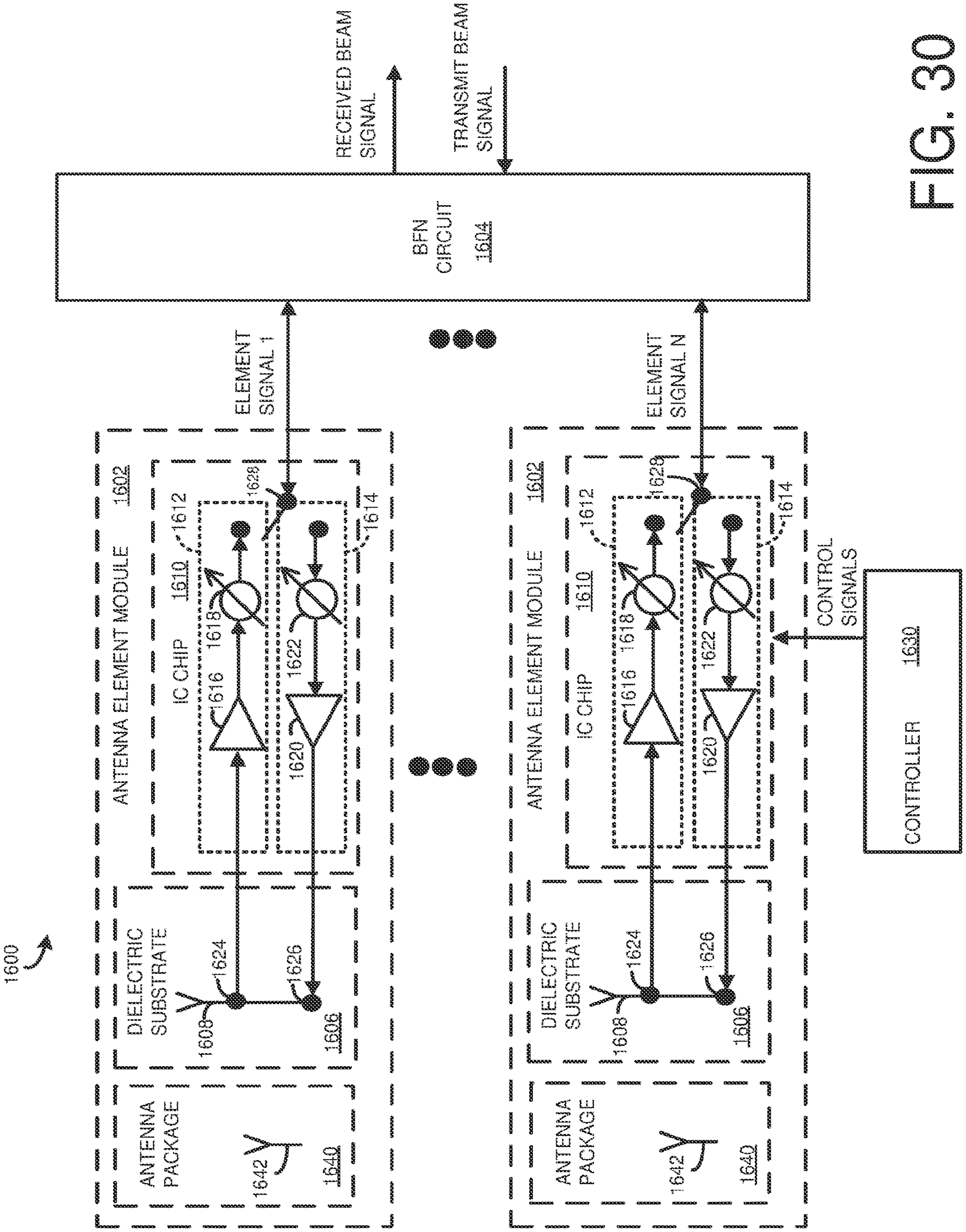
FIG. 30 illustrates a block diagram of an example phased array antenna operating in polarization duplex mode.

FIG. 30 illustrates a block diagram of a phased array antenna 1600 that depicts the logical interconnection of the phased array antenna 2 of FIG. 1 and/or the phased array antenna 50 of FIGS. 2 and 3 operating in polarization duplex mode, which can be a particular configuration of half-duplex mode. In polarization duplex mode, the phased array antenna 1600 can include circuitry for processing RF signals received with a first polarization and for propagating RF signals in a second polarization, orthogonal to the first polarization.

In the illustrated example, N number of antenna element modules 1602 communicate with a BFN circuit 1604. Each of the N number of antenna element modules 1602 can include a dielectric substrate 1606 with a feed 1608 (e.g., a slot or a pair of orthogonally arranged slots) disposed or integrated with the dielectric substrate 1606. Each of the N number of antenna element modules 1602 also can include an IC chip 1610. In the illustrated example, each IC chip 1610 can include a receiving path 1612 and a transmitting path 1614. The receiving path 1612 can include a receiving amplifier 1616 and a receiving phase shifter 1618 for adjusting signals received from a corresponding feed 1608. Similarly, the transmitting path 1614 can include a transmitting amplifier 1620 and a transmitting phase shifter 1622 for adjusting a corresponding element signal provided from the BFN circuit 1604.

The receiving path 1612 can be coupled to a first port 1624 of the feed 1608 and the transmitting path 1614 can be coupled to a second port 1626 of the feed 1608. The first port 1624 of the feed 1608 can be configured to output electrical signals converted from EM signals received at the feed 1608 that are in a first polarization, and the second port 1626 of the feed 1608 can be configured to convert electrical signals into EM signals received at the feed 1608 with a second polarization, orthogonal to the first polarization. For instance, the first polarization can be vertical polarization and the second polarization can be horizontal polarization, or vice versa. Alternatively, the first polarization can be right hand circular polarization (RHCP) and the second polarization can be left hand circular polarization (LHCP) or vice versa.

Each IC chip 1610 also can include a switch 1628 (e.g., a transistor switch) for switching between the receiving mode and the transmitting mode. The IC chips 1610 can receive control signals from a controller 1630 that can be implemented on an external system (e.g., a local system). The control signals can control a state of the switches 1628 to switch the phased array antenna 1600 from the receiving mode to the transmitting mode, or vice-versa. Additionally, in some examples, the control signals provided from the controller 1630 can control a variable amount of amplitude adjustment applied by each receiving amplifier 1616 and each transmitting amplifier 1620. Thus, in some examples, each receiving amplifier 1616 and each transmitting amplifier 1620 can be implemented as a variable gain amplifier, a switched attenuator circuit, etc. Similarly, in some examples, the control signals provided from the controller 1630 can control a variable amount of phase adjustment applied by each receiving phase shifter 1618 and each transmitting phase shifter 1622.

Each of the N number of antenna element modules 1602 can further include an antenna package 1640 adhered to the dielectric substrate 1606. The antenna package 1640 can include a radiating element 1642 that is spaced away from the feed 1408 via an air gap. The radiating element 1642 can be implemented as a patch antenna or multiple patch antennas.

In operation in the receiving mode, the controller 1630 sets the switches 1628 of the IC chips 1610 to route signals through the receiving path 1612. Moreover, in the receiving mode, an EM signal in the first polarization duplex mode received by each of the N number of radiating elements 1642 (or some subset thereof) can be coupled toward the corresponding feeds 1608. The feeds 1608 can convert the EM signals into electrical signals that can be provided to a corresponding IC chip 1610 for adjustment. Each receiving amplifier 1616 of the IC chips 1610 can amplify the provided signal and each receiving phase shifter 1618 can apply a phase shift to output N number of element signals, which can alternatively be referred to as adjusted signals. The N number of element signals can be provided to the BFN circuit 1604. The BEN circuit 1604 can combine the N number of element signals to form a received beam signal that can be provided to the local system for demodulating and processing.

In operation in the transmitting mode, the controller 1630 sets the switches 1628 to the transmitting path 1614 to transmit a beam signal that can be provided from the local system to the BFN circuit 1604. The BEN circuit 1604 divides the transmit beam signal into N number of element signals that can be provided to the N number of antenna element modules 1602. Each IC chip 1610 of the N number of antenna element modules 1602 can adjust a corresponding element signal to generate an adjusted signal that can be provided to a corresponding feed 1608. In the example illustrated, the adjusting can include the transmitting phase shifter 1622 phase shifting the element signal and the transmitting amplifier 1620 amplifying the element signal. Each feed 1608 can convert the adjusted signal into an EM signal and propagates the EM signal toward the corresponding radiating element 1642 of the antenna package 1640. The radiating element 1642 can couple the EM signal into free space.

In the polarization duplex mode, the phased array antenna 1600 switches between the receiving mode and the transmitting mode. However, by leveraging the orthogonal relationship of signals at the first port 1624 and signals at the second port 1626 of the radiating elements 1608, each antenna element module 1602 can be implemented with a single switch 1628 to reduce losses. Additionally, in this manner, the same antenna element modules 1602 can be employed for both the transmission and the reception of RF signals.

Figure 31:
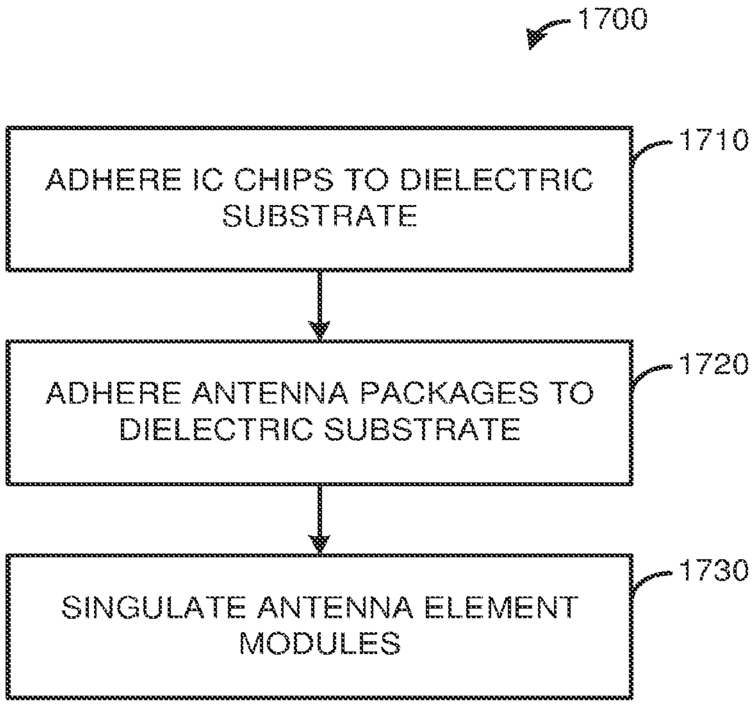
FIG. 31 illustrates a flow chart of an example method for fabricating an antenna element module.
Figure 32:
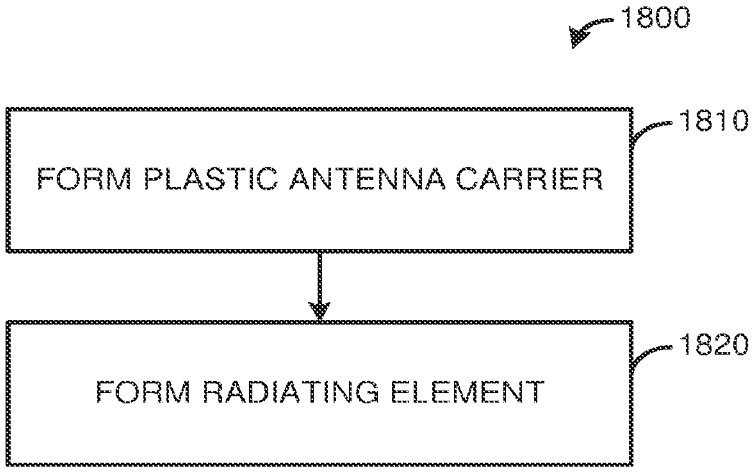
FIG. 32 illustrates a flow chart of an example method for fabricating an antenna package.

In view of the foregoing structural and functional features described above, an example method will be better appreciated with reference to FIGS. 31 and 32. While, for purposes of simplicity of explanation, the example methods of FIGS. 31 and 32 is shown and described as executing serially, the present examples are not limited by the illustrated order, as some actions can in other examples occur in different orders, multiple times and/or concurrently from that shown and described herein. Moreover, it is not necessary that all described actions be performed to implement a method.

FIG. 31 illustrates a flowchart of an example method 1700 for forming a plurality of antenna element modules, such as the antenna element modules 8 of FIG. 1, the antenna element modules 52 of FIGS. 2 and 3, the antenna element modules 102 of FIG. 4, the antenna element modules 152 of FIG. 5 and/or the antenna element module 900 of FIGS. 22 and 23. The method 1700 can be implemented with flip chip packaging techniques. At 1710, a plurality of IC chips (e.g., the IC chips 1004 of FIG. 24) can be adhered (mounted) to a lower surface of a dielectric substrate (e.g., the dielectric substrate 1000 of FIG. 24). The dielectric substrate can include a plurality of feeds within the dielectric substrate. At 1720, an array of antenna packages (e.g., the antenna packages 1008 of FIG. 25) can be adhered to an upper surface of the dielectric substrate to form an array of antenna element modules, wherein each antenna package comprises. Each antenna package can include a plastic antenna carrier. The plastic antenna carrier can include a body portion with a cavity for a radiating element and a plurality of legs extending from the body portion to the dielectric substrate. The plastic antenna carrier can also include a radiating element of a radiating antenna positioned in the cavity of the body portion of the plastic antenna carrier. The plurality of legs can space each radiating element apart from the feeds within the dielectric substrate. At 1730, the array of antenna element modules can be singulated to form the plurality of antenna element modules.

FIG. 32 illustrates a flowchart of an example method 1800 for forming an antenna package, such as the antenna package employed in the method 1700. As some examples, the resultant antenna package can be employed to implement the antenna package 22 of FIG. 1, the antenna package 70 of FIG. 2 and/or the antenna package 130 of FIG. 3. At 1810, a plastic antenna carrier (e.g., the plastic antenna carrier 402 of FIGS. 10-19 or the plastic antenna carrier 802 of FIGS. 20 and 21) of the antenna package can be formed. The plastic antenna carrier can be formed, for example, by injecting a first polymer in a mold to form an array plastic of antenna carriers through an injection molding process. Alternatively, the plastic antenna carrier can be formed by heating a sheet of the first polymer and shaping the heated sheet of the first polymer over a mold in a thermo molding process. The resultant plastic antenna carrier can include a cavity (e.g., the cavity 412 of FIGS. 10 and 11) for a radiating element. At 1820, a radiating element (e.g., the radiating element 414 of FIGS. 10 and 11) can be formed in the cavity of the plastic antenna carrier for form the antenna package. The radiating element can be formed by injecting a second polymer into the cavity of each plastic antenna carrier. Alternatively, the radiating element can be formed by employing electroplating on the cavity of each plastic antenna carrier to attach the second polymer.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An antenna element module comprising:

an antenna element including a feed and a radiating element;

a dielectric substrate having a first surface and comprising the feed of the antenna element; and a plastic antenna carrier adhered to the first surface of the dielectric substrate, the plastic antenna carrier comprising:

a body portion comprising a cavity for the radiating element of the antenna element, wherein:

the cavity has an opening at a first surface of the body portion and is a recess in the body portion between the first surface of the body portion and a second surface of the body portion opposite the first surface, and the radiating element is disposed in the opening of the cavity of the body portion such that the radiating element is positioned, at least in part, between the first and second surfaces of the body portion when disposed in the cavity; and a leg portion comprising one or more legs extending from the second surface of the body portion opposite the opening in the first surface of the dielectric substrate, the leg portion configured to introduce an air gap between the radiating element and the feed.

2. The antenna element module of claim 1, wherein:

the cavity is a first cavity; and the body portion further comprises a second cavity having an opening at the second surface of the body portion and being a recess in the body portion between the first and second surfaces of the body portion; and the antenna element further comprises a parasitic element disposed in the opening of the second cavity of the body portion such that the parasitic element is positioned, at least in part, between the first and second surfaces of the body portion when disposed in the second cavity, wherein the parasitic element underlies the radiating element.

3. The antenna element module of claim 1, wherein the plastic antenna carrier is formed of a first polymer and the radiating element is formed of a second polymer.

4. The antenna element module of claim 1, wherein:

the antenna element is a first antenna element of a plurality of antenna elements, each antenna element of the plurality of antenna elements comprising a respective feed of a plurality of feeds and a respective radiating element of a plurality of radiating elements such that the radiating element is a first respective radiating element of the plurality of radiating elements and the feed is a first respective feed of the plurality of feeds, and the cavity is a first cavity of a plurality of cavities each having an opening at the first surface of the body portion and being a recess in the body portion between the first and second surfaces of the body portion, wherein each respective radiating element is positioned in a respective cavity of the plurality of cavities.

5. The antenna element module of claim 4, wherein the plastic antenna carrier further comprises one or more recessed channels that separates each of the plurality of antenna elements from each other.

6. The antenna element module of claim 1, wherein:

the antenna element is a first antenna element of a plurality of antenna elements wherein each antenna element of the plurality of antenna elements comprises:

a respective radiating element of a plurality of radiating elements such that the radiating element is a first respective radiating element;

a respective feed of a plurality of feeds such that the feed is a first respective feed; and a parasitic element of a plurality of parasitic elements;

the cavity is a first cavity of a first set of cavities having openings on the first surface of the body portion;

the body portion of the plastic antenna carrier comprises a second set of cavities having openings on the second surface of the body portion;

each radiating element of the plurality of radiating elements is positioned in a respective cavity of the first set of cavities; and each parasitic element of the plurality of parasitic elements is positioned in a respective cavity in the second set of cavities and each radiating element in the plurality of radiating elements overlays and is spaced apart from a corresponding parasitic element in the plurality of parasitic elements.

7. The antenna element module of claim 6, wherein the body portion of the plastic antenna carrier further comprises one or more recessed channels formed in the first surface of the body portion to separate each of the plurality of antenna elements.

8. The antenna element module of claim 1, wherein the radiating element is a patch antenna.

9. The antenna element module of claim 1, wherein the one or more legs are positioned at one or more vertices of the plastic antenna carrier.

10. The antenna element module of claim 1, wherein the one or more legs of the plastic antenna carrier extend from the second surface of the body portion at a draft angle.

11. The antenna element module of claim 1, wherein the feed of the antenna element comprises a pair of orthogonally arranged slots within the first surface of the dielectric substrate.

12. The antenna element module of claim 1, wherein the one or more legs have a length of between .25 mm to 2 mm.

13. A phased array antenna comprising:

an array of antenna element modules, each of the array of antenna element modules comprising:

an antenna element including a feed and a radiating element;

a dielectric substrate having a first surface and comprising the feed of the antenna element; and a plastic antenna carrier adhered to the first surface of the dielectric substrate, the plastic antenna carrier comprising:

a body portion comprising a cavity for the radiating element of the antenna element, wherein:

the cavity has an opening at a first surface of the body portion and is a recess in the body portion between the first surface of the body portion and a second surface of the body portion opposite the first surface, and the radiating element is disposed in the opening of the cavity of the body portion such that the radiating element is positioned, at least in part, between the first and second surfaces of the body portion when disposed in the cavity; and a leg portion comprising one or more legs extending from the second surface of the body portion opposite the opening to the first surface of the dielectric substrate, the leg portion configured to introduce an air gap between the radiating element and the feed; and a multi-layer substrate underlying the array of antenna element modules, the multi-layer substrate including a beam forming network (BFN) circuit formed on a layer of the multi-layer substrate and the BEN circuit is in electrical communication with an integrated circuit (IC) chip of each of the array of antenna element modules.

14. The phased array antenna of claim 13, wherein the cavity of each antenna element module of the array of antenna element modules is a first cavity, and each antenna element module of the array of antenna element modules further comprises:

a second cavity formed on the second surface and is situated between the first surface of the body portion and the second surface of the body portion such that the second cavity is positioned between the first and second surfaces of the body portion of the respective plastic antenna carrier; and a parasitic element of a respective antenna element positioned in the second cavity of the body portion of the respective plastic antenna carrier, wherein the parasitic element underlies the respective radiating element.

15. A method for forming a plurality of antenna element modules, the method comprising:

adhering an array of antenna packages to a surface of a dielectric substrate to form an array of antenna element modules, wherein each antenna package comprises;

an antenna element including a feed and a radiating element; and a plastic antenna carrier comprising:

a body portion comprising a cavity for the radiating element of the antenna element, wherein:

the cavity has an opening at a first surface of the body portion and is a recess in the body portion between the first surface of the body portion and a second surface of the body portion opposite the first surface, and the radiating element is disposed in the opening of the cavity of the body portion such that the radiating element is positioned, at least in part, between the first and second surfaces of the body portion when disposed in the cavity; and a leg portion comprising one or more legs extending from the second surface of the body portion opposite the opening to the first surface of the dielectric substrate, the leg portion configured to introduce an air gap between the radiating element and the feed; and singulating the array of antenna element modules to form the plurality of antenna element modules.

16. The method of claim 15, further comprising:

injecting a first polymer in a mold to form an array of plastic antenna carriers; and injecting a second polymer into cavities in the array of plastic antenna carriers to form the radiating element in each respective plastic antenna carrier of the array of plastic antenna carriers to form the array of antenna packages.

17. The method of claim 15, wherein the cavity of each antenna package in the array of antenna packages is a first cavity formed on an upper surface of the body portion of the respective plastic antenna carrier, each antenna package further comprising:

a second cavity formed on a lower surface of the body portion of the respective plastic antenna carrier; and a parasitic element positioned in the second cavity of the body portion, and the parasitic element underlies the radiating element of the respective antenna package.

18. The method of claim 15, wherein each antenna module has a regular tile base shape.

19. The method of claim 15, wherein each singulated antenna element module in the plurality of antenna element modules comprises two or more antenna elements.

20. The method of claim 15, wherein the one or more legs of each plastic antenna carrier extend from a respective body portion at a draft angle.

21. The method of claim 15, wherein the radiating element of each antenna package of the array of antenna element modules is a patch antenna.

22. The method of claim 15, wherein each respective feed within the dielectric substrate comprises a pair of orthogonally arranged slots within the first surface of the dielectric substrate.

* * * * *